United States Patent
Keller et al.

(10) Patent No.: US 12,368,761 B2
(45) Date of Patent: Jul. 22, 2025

(54) FIRST IMS NODE, FIRST CORE NETWORK NODE, SECOND IMS NODE, AND METHODS PERFORMED THEREIN

(71) Applicant: Telefonaktiebolaget LM Ericsson (publ), Stockholm (SE)

(72) Inventors: Ralf Keller, Würselen (DE); Afshin Abtin, Sollentuna (SE); Anders Ryde, Saltsjöbaden (SE); Mattias Dahlqvist, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

(21) Appl. No.: 18/547,395

(22) PCT Filed: Mar. 31, 2021

(86) PCT No.: PCT/SE2021/050291
§ 371 (c)(1),
(2) Date: Aug. 22, 2023

(87) PCT Pub. No.: WO2022/211686
PCT Pub. Date: Oct. 6, 2022

(65) Prior Publication Data
US 2024/0137392 A1 Apr. 25, 2024
US 2024/0236151 A9 Jul. 11, 2024

(51) Int. Cl.
*H04L 65/1016* (2022.01)
*H04L 65/1045* (2022.01)
(Continued)

(52) U.S. Cl.
CPC ...... *H04L 65/1016* (2013.01); *H04L 65/1045* (2022.05); *H04L 65/1063* (2013.01); *H04L 65/1073* (2013.01)

(58) Field of Classification Search
CPC ............ H04L 65/1016; H04L 65/1045; H04L 65/1063; H04L 65/1073
See application file for complete search history.

(56) References Cited

U.S. PATENT DOCUMENTS

| 9,003,044 | B2 * | 4/2015 | Bouthemy | H04L 12/66 709/227 |
| 11,564,154 | B2 * | 1/2023 | Belling | H04W 8/00 |

(Continued)

FOREIGN PATENT DOCUMENTS

EP 3731486 A1 10/2020

OTHER PUBLICATIONS

"3GPP TR 23.794 V1.0.0", 3rd Generation Partnership Project; Technical Specification Group Services and System Aspects; Study on Enhanced IMS to 5GC Integration (Release 16), Mar. 2019, pp. 1-83.

(Continued)

*Primary Examiner* — G. C. Neurauter, Jr.
(74) *Attorney, Agent, or Firm* — Murphy, Bilak & Homiller, PLLC

(57) ABSTRACT

A method performed by a first IP multimedia system, IMS, node (15), for handling a network function in a communication network. The first IMS node (15) requests a first core network node (13) for at least a part of contact information of a network function instance, and receives a response from the first core network node (13) with at least the part of the contact information for the network function instance. The
(Continued)

first IMS node (15) communicates with a second IMS node (16) or a core network node over a service based interface, based on the received part of the contact information for the network function instance.

20 Claims, 21 Drawing Sheets

(51) Int. Cl.
 *H04L 65/1063* (2022.01)
 *H04L 65/1073* (2022.01)

(56) References Cited

U.S. PATENT DOCUMENTS

| | | | | |
|---|---|---|---|---|
| 11,792,236 | B2* | 10/2023 | Agarwal | H04L 65/1104 370/352 |
| 11,997,585 | B2* | 5/2024 | Raval | H04W 12/062 |
| 12,074,920 | B2* | 8/2024 | Das | H04L 65/1073 |
| 2010/0069101 | A1* | 3/2010 | Mahdi | H04L 65/103 370/329 |
| 2024/0008103 | A1* | 1/2024 | Merino Vazquez | H04L 61/4588 |

OTHER PUBLICATIONS

"3GPP TS 23.228 V16.0.0", 3rd Generation Partnership Project; Technical Specification Group Services and System Aspects; IP Multimedia Subsystem (IMS); Stage 2 (Release 16), Mar. 2019, pp. 1-146.

"3GPP TS 23.288 V17.2.0", 3rd Generation Partnership Project; Technical Specification Group Services and System Aspects; Architecture enhancements for 5G System (5GS) to support network data analytics services (Release 17), Sep. 2021, pp. 1-196.

"3GPP TS 23.501 V15.6.0", 3rd Generation Partnership Project; Technical Specification Group Services and System Aspects; System Architecture for the 5G System; Stage 2 (Release 15), Jun. 2019, pp. 1-243.

"3GPP TS 23.502 V16.0.0", 3rd Generation Partnership Project; Technical Specification Group Services and System Aspects; Procedures for the 5G System; Stage 2 (Release 16), Mar. 2019, pp. 1-130.

"IMS discovery for HSS interface type, and user HSS instance", SA WG2 Meeting #132, S2-19003011, Xian China, Apr. 8-12, 2019, pp. 1-8.

* cited by examiner

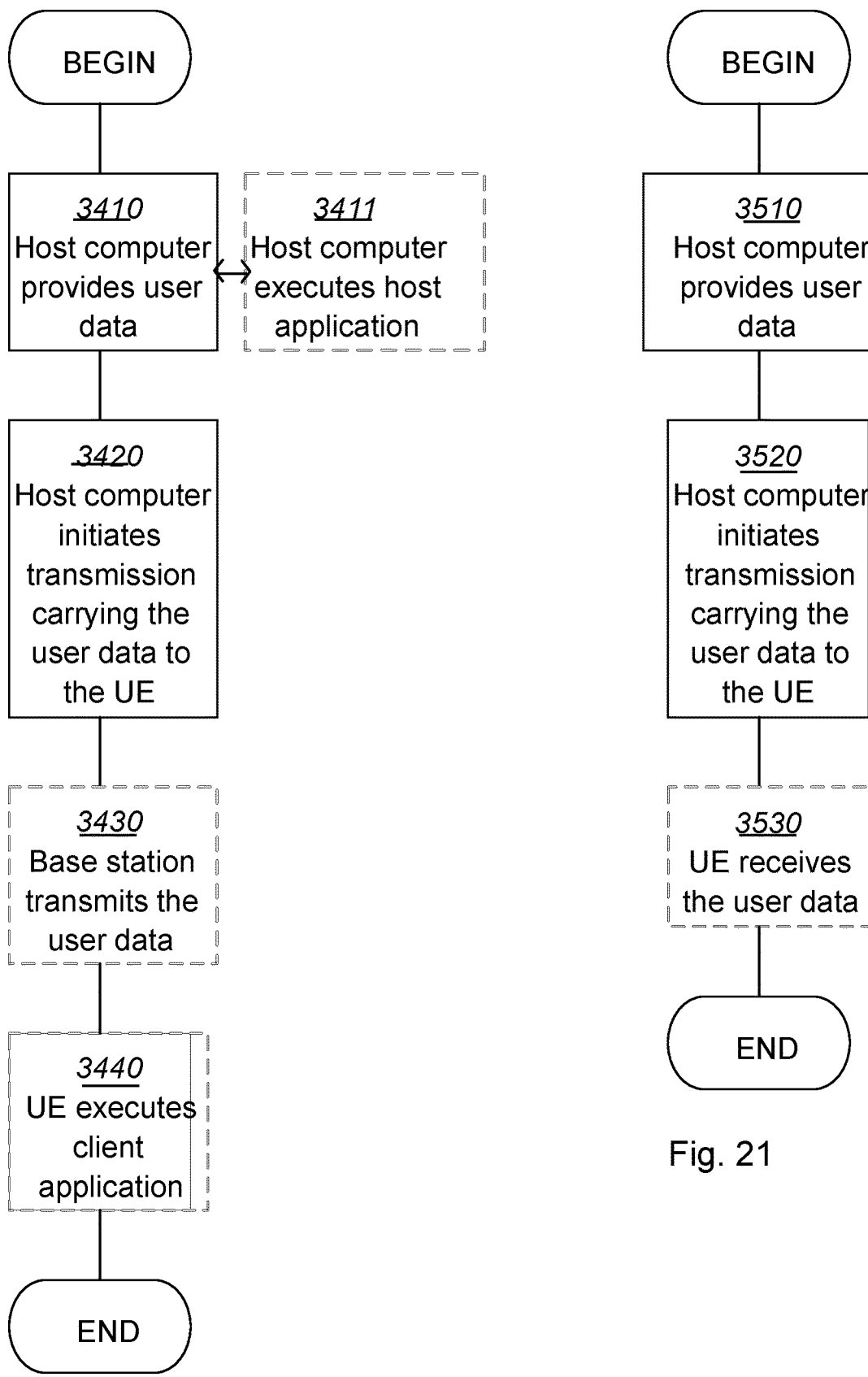

FIRST IMS NODE, FIRST CORE NETWORK NODE, SECOND IMS NODE, AND METHODS PERFORMED THEREIN

TECHNICAL FIELD

Embodiments herein relate to a first IP multimedia subsystem (IMS) node, a first core network node, a second IMS node and methods performed therein for communication. Furthermore, a computer program and a computer readable storage medium are also provided herein. In particular, embodiments herein relate to handling services in a communication network.

BACKGROUND

In a typical communication network, wireless devices, also known as wireless communication devices, mobile stations, stations (STA) and/or UE, communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB", or a gNodeB. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes which can be connected directly to one or more core networks, i.e. they do not need to be connected to the core via RNCs.

With the emerging 5G technologies such as New Radio (NR), the use of a large number of transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify received signals coming from a selected direction or directions, while suppressing received unwanted signals coming from other directions.

Service Based Architecture (SBA) was defined in 3GPP Release 15 for 5G core (5GC) and has evolved in Release 16 3GPP. FIG. 1 shows from 3GPP 23.501 v.15.6.0 on 5GC SBA.

In Release 16 3GPP, IP multimedia subsystem (IMS) interfaces to 5GC were also defined as Service Based Interfaces. In FIG. 2 it is shown the IMS interfaces that are specified with services from 3GPP TS 23.228 16.0.0.

It introduced N5 (corresponding to Diameter based Rx), N70 (corresponding to Diameter Cx) and N71 (Corresponding to Diameter Sh) see FIG. 3.

Additionally, charging interfaces from IMS network functions (NF) to Charging system which are based on Diameter, are subject for service based interface (SBI) evolution in Rel 17 and Rel 18 of 3GPP.

IMS internal signaling communication, e.g. between proxy-call session control function (P-CSCF) and interrogating or serving (I/S)—call session control function (CSCF) is based on session initiation protocol (SIP) protocol and that has not changed. See FIG. 4 from 3GPP TS 23.228 v.16.0.0.

The Service Based Architecture is based on the HTTP/2 protocol.

Additionally, network exposure function (NEF) and Network Data Analytics Function (NWDAF) for exposure of network data analytics capabilities are defined in 3GPP TS 23.502 v.16.0.0 and 3GPP TS 23.288. These capabilities are as Monitoring capability, Provisioning capability, Policy/Charging capability and Analytics reporting capability.

Example:

In today's 5G voice solutions P-CSCF can subscribe to or receive various events and information from the combined 4G & 5G Packet Core like:

Change of public land mobile network (PLMN)
Change of Radio Access Technology (RAT) Type
Change of IP connectivity access network (CAN)
EPS Fallback indication The information received in these notifications and events need to be transported/relayed between P-CSCF and other IMS NFs like the IMS application server (AS) where the information is used. The information is transported/relayed as additional standardized information elements in the SIP messages in the IMS procedures between UE and Network, or between Network entities. Sometimes the information transfer must wait a significant time before an IMS procedure occurs.

FIG. 5 shows IMS architecture and protocols as of 3GPP R-16.

SIP User Agent (UA) in the UE communicates with IMS over Packet Data access (via NG-RAN and 5GC User Plane user plane function (UPF)).

While the session related signaling procedures in IMS are based on SIP and it will remain so (also has relation to UEs as example voice over LTE (VoLTE) and Voice in 5GS capable smartphones which have SIP clients), but as SIP is the only signaling protocol used in IMS for session setup, even non-session related information need to be transported using SIP, in existing or new signaling procedures, following existing signaling paths.

SUMMARY

Additionally, IMS is adopted in not only Voice and Video solutions (VoLTE and Voice in 5GS, fixed networks) but also for other services as Mission Critical Push to Talk (MC-PTT) and it is also envisioned that the Voice solution of IMS is enriched with new concept as the Data Channel (introduced in core network and terminals 4 (CT4) to enable additional media components to be added to voice a session). All these would imply that there will be a need for more flexibility of information exchange between IMS NFs but also for external actors to collect available information for analytics, machine learning or automatic orchestration from exposure interfaces.

When the system is evolved, each time a new event or information is introduced, it will also result in SIP protocol extension to be able to carry the information from Packet Core to other IMS nodes. This specification work is time consuming in 3GPP and in some cases not relevant for the SIP signaling or session establishment, meaning just overloading the protocol and hence would benefit of de-coupling from SIP signaling for new use cases. Also, carrying any information to and from exposure framework or data analytics will not be based on SIP protocol but on HTTP.

An example of this case is when notification is received on one IMS NF, and if any other NF would be interested in the same information, then new SIP procedures and information elements would be needed relaying that information unless it is in relation to a session setup or session termination.

An object of embodiments herein is to provide a mechanism for improving performance of the communication network in an efficient manner.

According to an aspect of embodiments herein the object may be achieved by a method performed by a first IMS node, e.g. AS server, for handling a network function in a communication network. The first IMS node requests a first core network node for at least a part of contact information of a network function instance, and receives a response from the first core network node with at least the part of the contact information for the network function instance. The first IMS node communicates with a second IMS node or a core network node over a SBI, based on the received part of the contact information for the network function instance.

According to another aspect of embodiments herein the object may be achieved by a method performed by a second IMS node, e.g. a P-CSCF, for handling a network function in a communication network. The second IMS node registers a network function instance with contact information at a network repository function node being a first core network node, wherein the contact information for the network function instance comprises a SBI address and a SIP address.

According to yet another aspect of embodiments herein the object may be achieved by a method performed by a first core network node, such as a NRF, for handling a network function in a communication network. The first core network node receives a registering of a network function instance with contact information from a second IMS node. The first core network node then receives a request from a first IMS node or another core network node for at least a part of the contact information of the network function instance; and transmits a response to the first IMS node or the other core network node with at least the part of the contact information for the network function instance, wherein the contact information for the network function instance comprises a SBI address and a SIP address.

It is furthermore provided herein a computer program comprising instructions, which, when executed on at least one processor, cause the at least one processor to carry out any of the methods above, as performed by the first IMS node, the first core network node, and the second IMS node, respectively . It is additionally provided herein a computer-readable storage medium, having stored thereon a computer program comprising instructions which, when executed on at least one processor, cause the at least one processor to carry out the method above, as performed by the first IMS node, the first core network node, and the second IMS node, respectively.

According to still another aspect of embodiments herein the object may be achieved by a providing a first IMS node, e.g. AS server, for handling a network function in a communication network. The first IMS node is configured to request a first core network node for at least a part of contact information of a network function instance, and to receive a response from the first core network node with at least the part of the contact information for the network function instance. The first IMS node is further configured to communicate with a second IMS node or a core network node over a SBI interface, based on the received part of the contact information for the network function instance.

According to yet still another aspect of embodiments herein the object may be achieved by providing a second IMS node, e.g. a P-CSCF, for handling a network function in a communication network. The second IMS node is configured to register a network function instance with contact information at a network repository function node being a first core network node, wherein the contact information for the network function instance comprises a SBI address and a SIP address.

According to another aspect of embodiments herein the object may be achieved by providing a first core network node, such as a NRF, for handling a network function in a communication network. The first core network node is configured to receive a registering of a network function instance with contact information from a second IMS node. The first core network node is further configured to receive a request from a first IMS node or another core network node for at least a part of the contact information of the network function instance; and to transmit a response to the first IMS node or the other core network node with at least the part of the contact information for the network function instance, wherein the contact information for the network function instance comprises a SBI address and a SIP address.

By introducing a Service Based Interface for relevant IMS network functions (NF) or network function instances, exchange of non-session related information can be made more efficient, where consumers and producers of information can more easily connect, share and consume relevant information, and at the same time evolve the IMS architecture in alignment with 3GPP architectural evolution.

As one example, P-CSCF, being an example of the second IMS node, could provide a Service Based Interface (SBI) and allow for Subscription to various elements of information for relevant first IMS node, such as IMS AS, to consume, but the principles can be applied to other use cases.

One applicable scenario is for example when a call is ongoing and the UE has experienced a change of PLMN, RAT Type, and/or IP CAN. Normally there is no SIP signalling to provide the information from the second IMS node, e.g. the P-CSCF, to the first IMS node, e.g. the IMS AS, in existing call signalling procedures, or when any of the events are triggered without any ongoing call (no session related SIP signalling), this is just one example and it may be extended to many other scenarios. In this example, IMS AS, i.e. the first IMS node, may use the new proposed SBI Service, and may subscribe to relevant information from P-CSCF, i.e. the second IMS node. The session related procedures in the IMS AS will not be impacted and there will not be a need to have direct interaction with 5GC.

Embodiments herein de-couple non session related information exchange between IMS nodes from SIP extension and SIP routing principles and thereby enables for higher flexibility and efficiency. The SBI services produced in the IMS NFs can also be used by non-SIP network functions like NEF and NWDAF to receive information from IMS NFs.

Thus, adding Service based interfaces into IMS architecture may:
  decouple non-session traffic from normal IMS routing and information using SBA/SBI principles;
  lower the impact and complexity for introduction of new functions;
  have positive impacts on SIP signalling and processing load as it involves only IMS NFs that are affected e.g. everything do not need to be routed via S-CSCF in IMS Core; and may
  enable higher flexibility and extendibility in the IMS architecture.

In one specific case, it enables an IMS AS to subscribe to P-CSCF PLMN ID change which is important information for an IMS AS, both as output to charging but also to consider in Supplementary Services execution. By introducing a direct connection using SBA/SBI principles rather than extending the SIP procedures to relay the information to AS by introducing corresponding SIP procedure, will not only offload the SIP signaling but also make sure the information is direct and relevant in time.

Hence, embodiments herein provide a mechanism that improve the performance of the wireless communication network.

BRIEF DESCRIPTION OF THE DRAWINGS

Embodiments will now be described in more detail in relation to the enclosed drawings, in which:

FIGS. 20 to 23 are flowcharts illustrating methods implemented in a communication system including a host computer, a base station and a user equipment.

DETAILED DESCRIPTION

Figure 1:
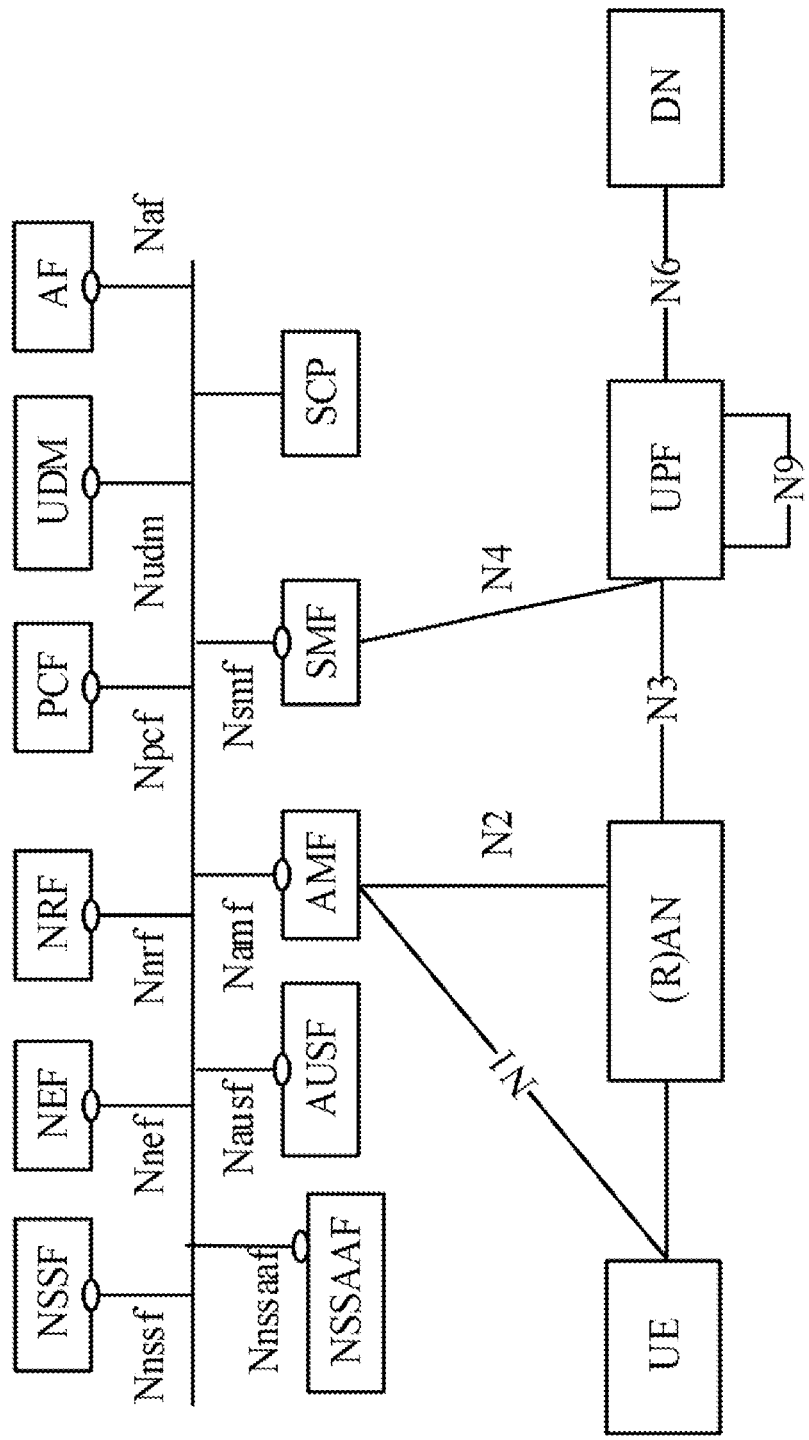
FIG. 1 is a schematic overview of a 5GC SBA.
Figure 2:
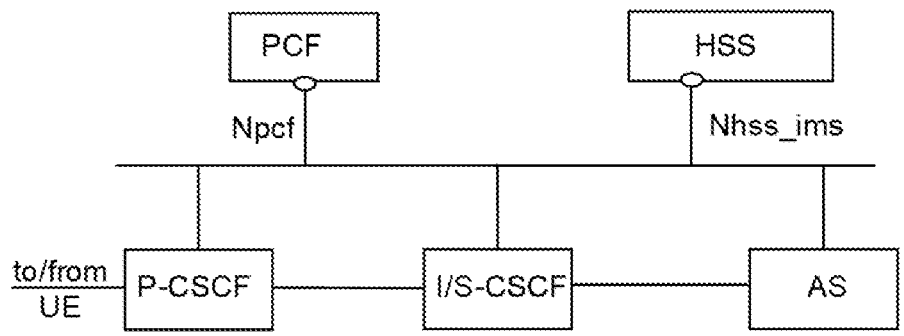
FIG. 2 shows the IMS interfaces that are specified with services according to prior art.
Figure 3:
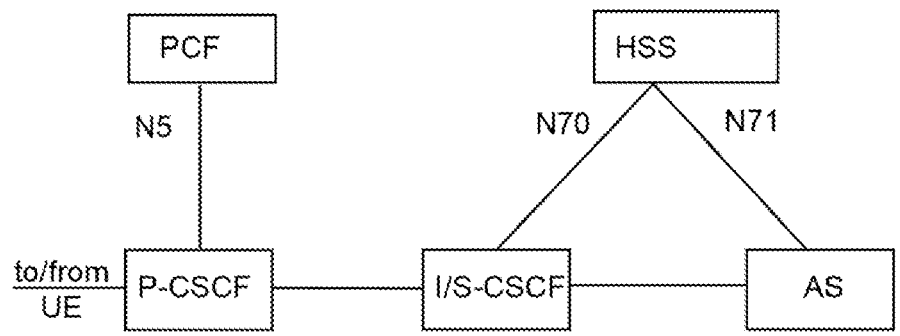
FIG. 3 shows IMS SBA reference points according to prior art.
Figure 4:
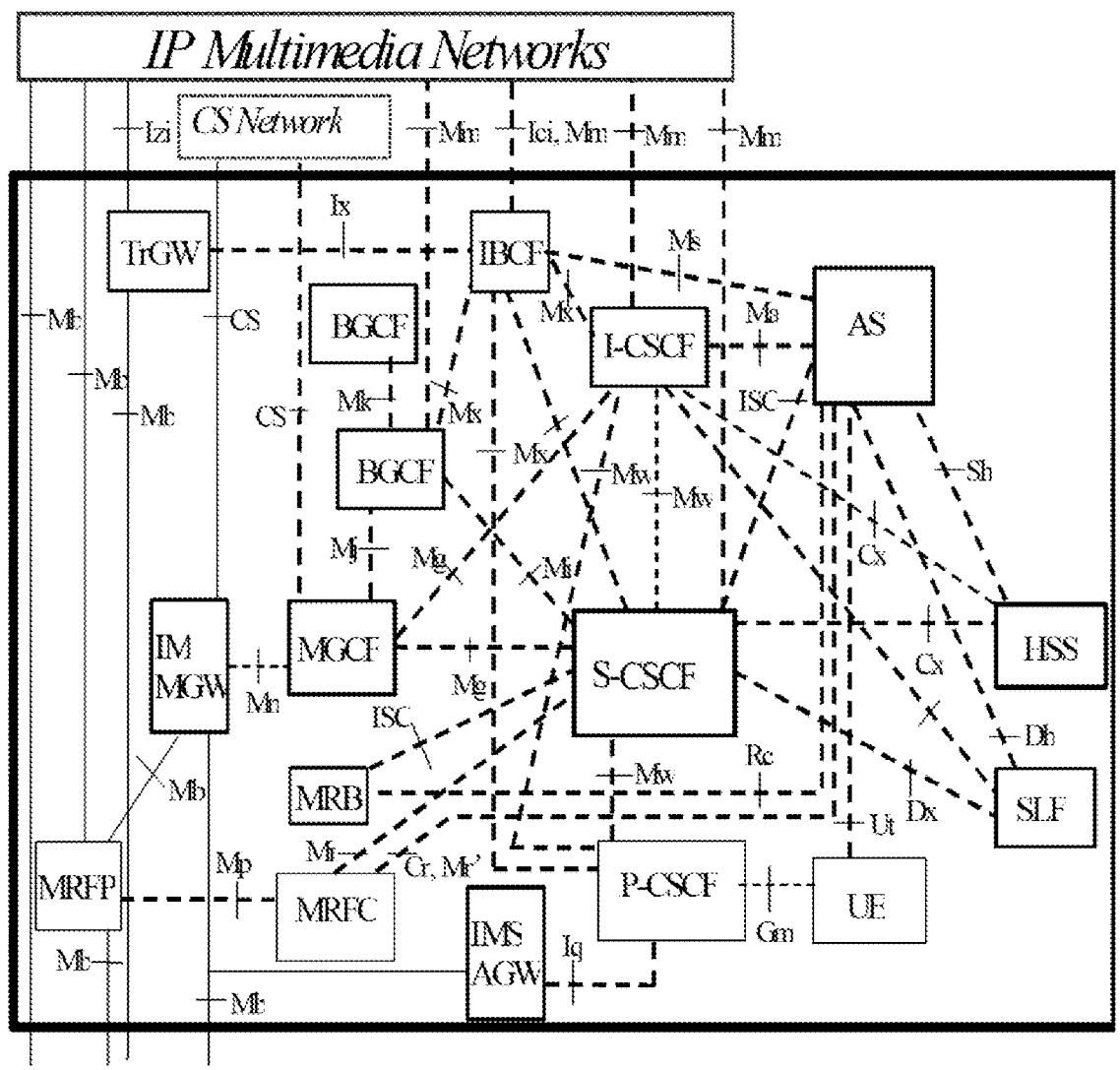
FIG. 4 shows IMS architecture according to prior art.
Figure 5:
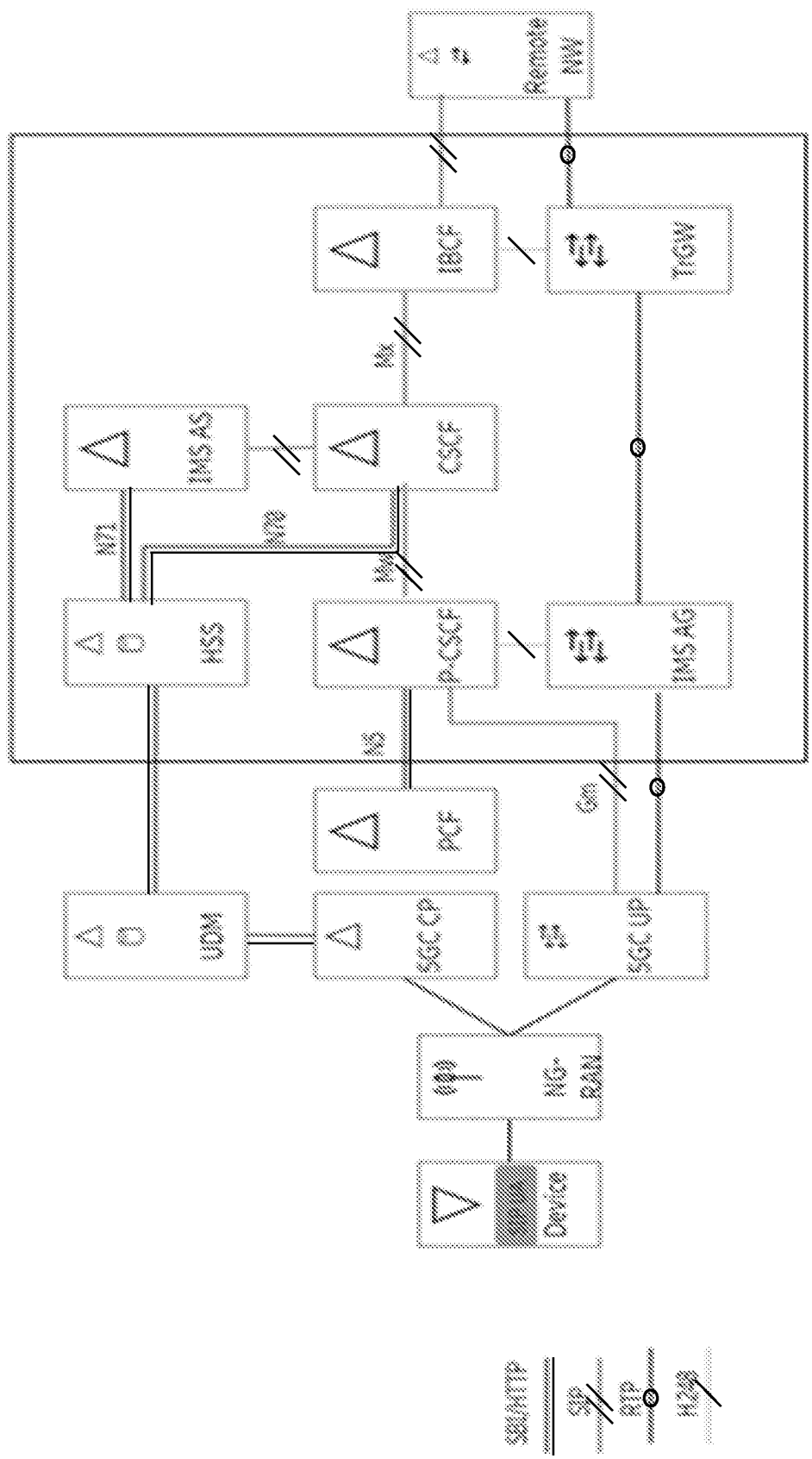
FIG. 5 shows IMS architecture and protocols according to prior art.
Figure 6:
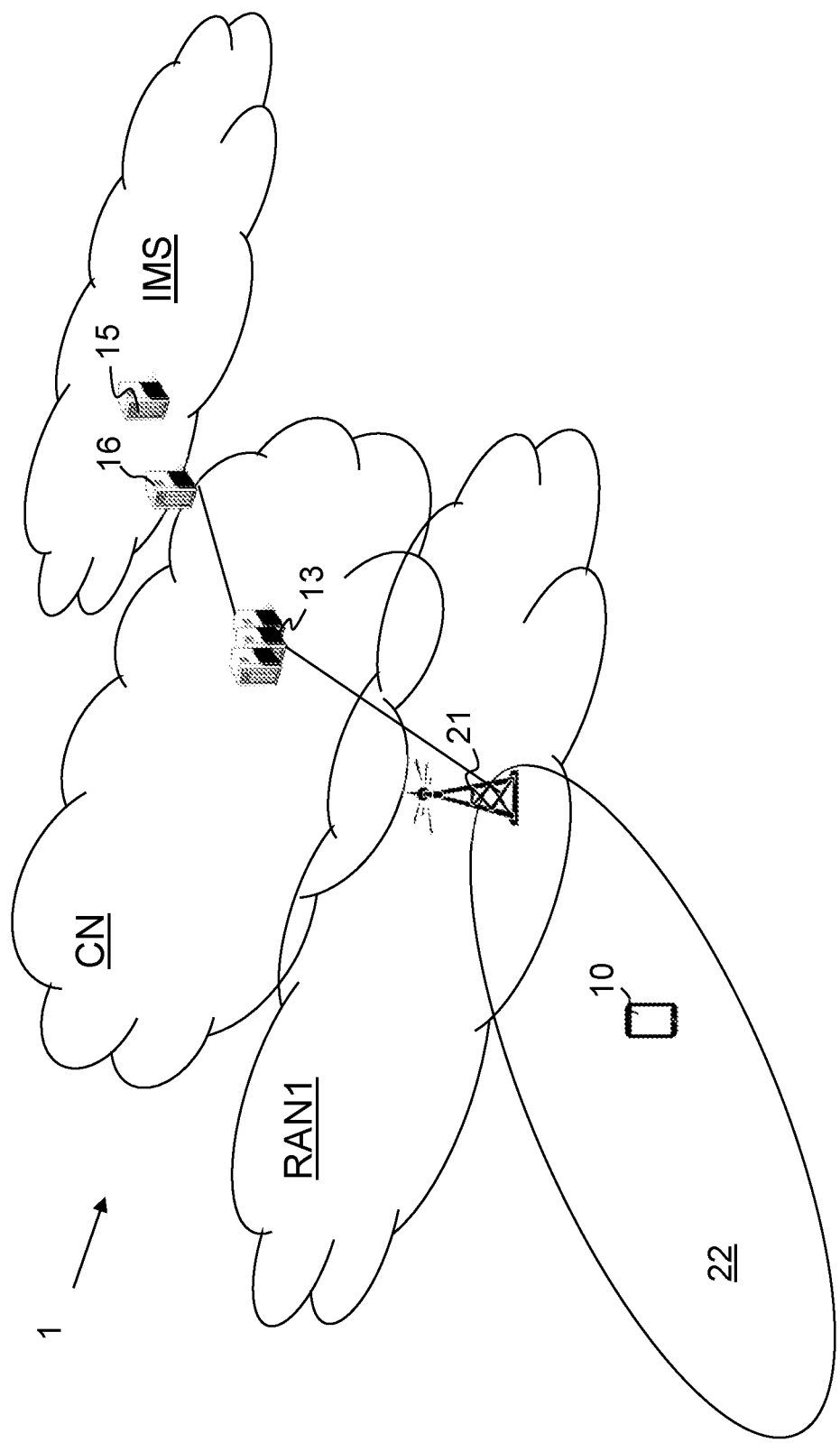
FIG. 6 is a schematic overview illustrating embodiments herein.

Embodiments herein relate to communication networks in general. FIG. 6 is a schematic overview depicting a communication network 1. The communication network 1 comprises one or more RANs e.g. a first RAN (RAN1), connected to one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, UEs e.g. a UE 10 such as a mobile station, a non-access point (non-AP) STA, a STA, a wireless device and/or a wireless terminal, are connected via the one or more RANs, to the one or more CNs, e.g. comprising CN nodes 13 such as a Network Repository Function (NRF) node, Unified Data Management (UDM) node, an Authentication Server Function (AUSF) node, a HSS. It should be understood by those skilled in the art that "UE" is a non-limiting term which means any terminal, wireless communication terminal, user equipment, Machine Type Communication (MTC) device, Internet of Things operable device, Device to Device (D2D) terminal, mobile device e.g. smart phone, laptop, mobile phone, sensor, relay, mobile tablets or any device communicating within a cell or service area.

The communication network 1 comprises a radio network node 21, providing radio coverage over a geographical area, a radio coverage area 22, of a first radio access technology (RAT), such as New Radio (NR), LTE, UMTS, Wi-Fi or similar. The radio network node 21 may be a radio core node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the first radio network node 12 depending e.g. on the first radio access technology and terminology used.

The communication network 1 provides IMS services, such as voice over LTE (VoLTE) or similar, and comprises a first IMS node 15 and a second IMS node 16 of an IMS. The first IMS node 15 may be an application server. The second IMS node 16 may be a Home Subscriber Server (HSS) or a Call Session Control Function (CSCF) node such as a P-CSCF or a S-CSCF node. The Call session control function e.g. facilitates Session Internet Protocol (SIP) setup and teardown and the HSS plays the role of a location server in IMS, in addition to acting as an authentication, authorization, accounting (AAA) server. The CSCF may comprise one or more of distributed functions e.g. a proxy CSCF node (P-CSCF), an Interrogating CSCF (I-CSCF) node, and a Serving CSCF (S-CSCF) node. The P-CSCF acts as the entry point in the IMS network. The HSS is the main database of the current generation's cellular communications systems. It contains subscriber-related information, such as the authentication information and the list of services to which each user is subscribed.

As stated above the communication network comprises a number of core network nodes such as a first core network node 13 for example an NRF for handling registration of network functions and network function instances.

According to embodiments herein the second IMS node 16 such as a P-CSCF or a telephony application server (TAS), may register a network function instance such as updating of mobility information at the first core network node 13 being an NRF. The first IMS node 15 requests the first core network node 13 for contact information, such as SBI address, for the network function instance, and the first core network node provides to the first IMS node 15, the SBI address mapped to a SIP address of the network function instance. The first IMS node 15 may then use a service relating to the network function instance using the contact information. Thus, the first IMS node 15 may be communicating with the second IMS node 16 over a SBI for information regarding non-session related network function omitting usage of the SIP protocol. It should be noted that nodes performing the methods herein may be node instances in a cloud implementation, wherein a node instance may be a particular individual in a pool of nodes as well as a core network node.

Figure 7A:
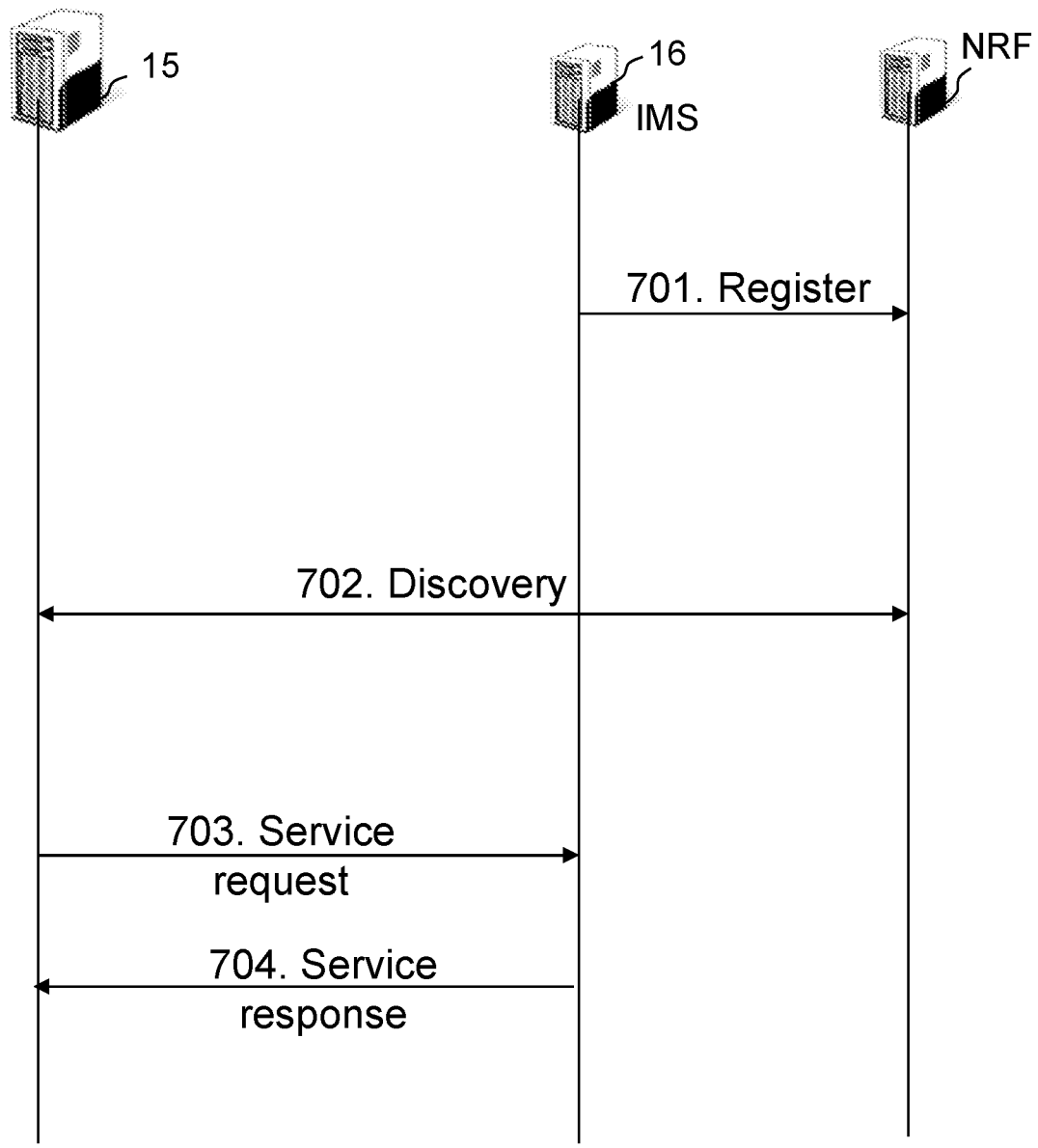
FIG. 7a is a combined signalling scheme and flowchart according to some embodiments herein.

FIG. 7a is a combined signalling scheme and flowchart depicting embodiments herein.

Action 701. The second IMS node 16 registers a network function instance at the first core network node 13 i.e. the NRF.

Action 702. The first IMS node 15 discovers the network function instance by retrieving contact information for the network function instance from the first core network node 13. The first IMS node 15 may use one part of the contact information such as SIP address of the second IMS node with the service to retrieve SBI address of the second IMS node 16. Thus, all information held in the NRF may be fetched, using one of its addresses as search key (can be either SBI address or SIP address). And the first IMS node 15 or actually any network node can extract the requested address from the contact information received.

Action 703. The first IMS node 15 may then transmit a service request for a service of the network function instance to the second IMS node 16 using the contact information such as the SBI address.

Action 704. The second IMS node 16 may then respond with a response related to the service, for example with radio access related information or with mobility related information. For example, it may be a request and response using SBI by the first IMS node 15 or a Subscription to information from the first IMS node where the second IMS node may notify when there is a trigger for it, e.g., a change of PLMN and then it will notify the first IMS node 15.

Figure 7B:
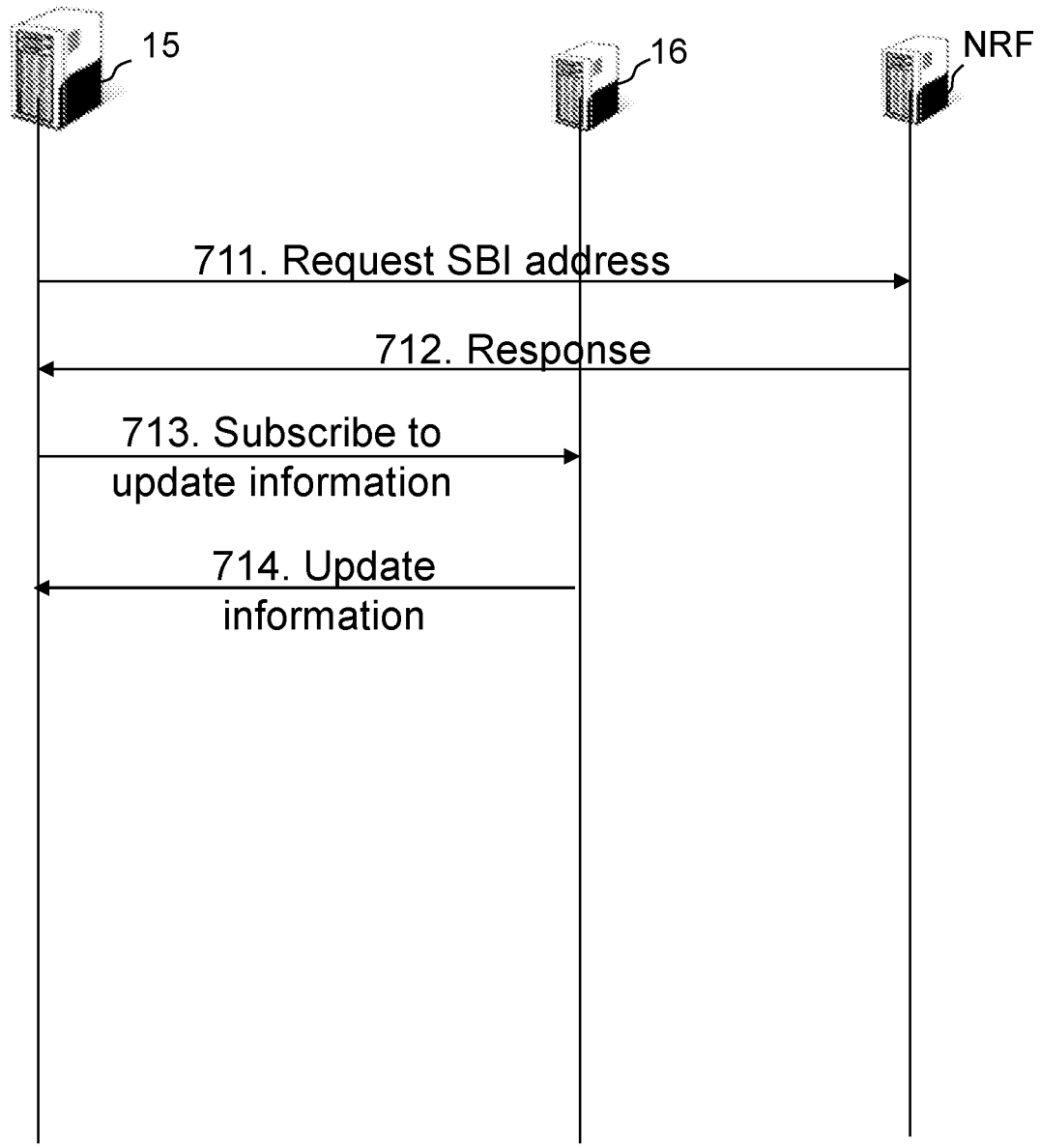
FIG. 7b is a combined signalling scheme and flowchart according to some embodiments herein.

FIG. 7b is a combined signalling scheme and flowchart depicting embodiments herein.

Action 711. The first IMS node 15 requests contact information or part of the contact information, such as address information e.g. SBI address and/or SIP address, from the first core network node 13 for the network function instance by retrieving contact information for the network function instance from the first core network node 13.

Action 712. The first core network node 13 transmits at least the part of contact information back to the requesting first IMS node 15.

Action 713. The first IMS node 15 may then use the part of the contact information for the network function instance at the second IMS node 16 for requesting a service such as subscription to updated information. Updated information herein meaning for example a change of PLMN, change of RAT Type, and change of IP connectivity access network, CAN.

Action 714. The second IMS node or second IMS node instance responds with a response related to the service, for example, the updated information upon occurrence of a change or notifies the first IMS node 15 at a later stage when an event takes place.

Figure 8:
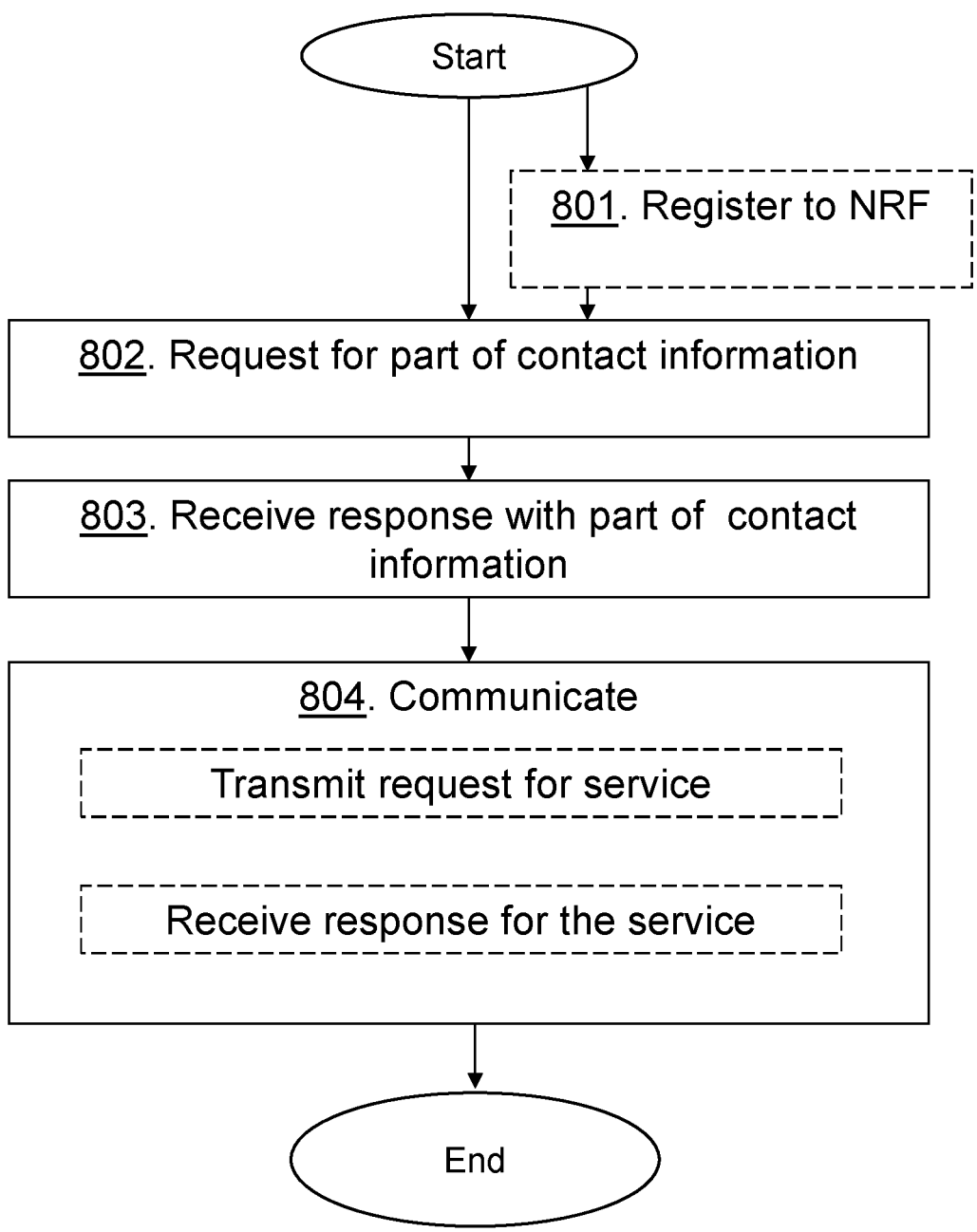
FIG. 8 is a flowchart depicting embodiments of a method performed by a first IMS node.

Example embodiments of a method performed by the first IMS node 15 such as an IMS AS, for handling a network function in the communication network will now be described with reference to a flowchart depicted in FIG. 8. The actions do not have to be taken in the order stated below, but may be taken in any suitable order. Optional actions that may be performed in some embodiments are marked with dashed boxes.

Action 801. The first IMS node 15 may register an own network function instance at the first core network node 13 such as a NRF node. The first IMS node 15 may register the own network function instance by registering the network function instance via the SBI and the registration comprising an application programming interface address for network function instance's services exposed over a network function instance's service based interface address and a network function instance's session initiation protocol address.

Action 802. The first IMS node 15 requests the first core network node 13 for at least a part of the contact information, such as an SBI address, of a network function instance such as the network function instance of the second IMS node 16.

Action 803. The first IMS node 15 receives a response from the first core network node 13 with at least the part of the contact information for the network function instance. The part of the contact information for the network function instance may comprise a SBI address. It may further or alternatively comprise a SIP address. The contact information enables mapping between the SIP address and the SBI address for the network function instance. For example, the first IMS node queries NRF using a NF Type produced service and a SIP address to an NF instance of that NF type and retrieves an SBI API root address of the service produced in that NF instance.

Action 804. The first IMS node 15 then communicates with the second IMS node 16 (second IMS node instance) or another core network node (core network node instance) over the SBI, based on the received part of the contact information for the network function instance. For example, the first IMS node 15 may transmit to the second IMS node 16 a request for a service relating to the network function instance. The first IMS node 15 may then receive a response from the second IMS node 16 relating to the service. The service may for example relate to subscribe to updated information. Updated information may comprise but are not limited to one or more of the following: a change of PLMN, change of RAT Type, and change of IP connectivity access network (CAN).

Figure 9:
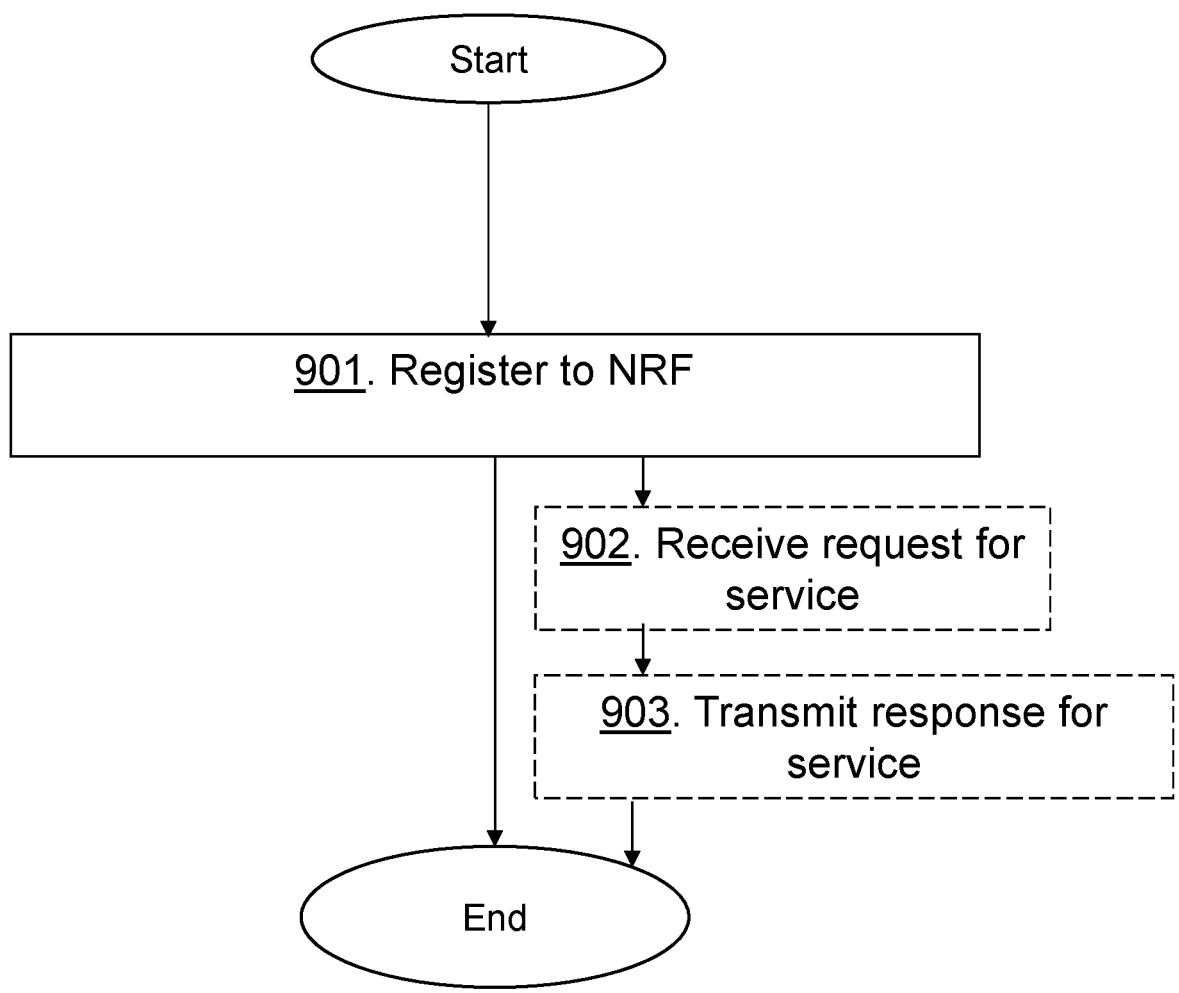
FIG. 9 is a flowchart depicting embodiments of a method performed by a second IMS node.

Example embodiments of a method performed by the second IMS node 16, for handling a network function in the communication network will now be described with reference to a flowchart depicted in FIG. 9. The actions do not have to be taken in the order stated below, but may be taken in any suitable order. Optional actions that may be performed in some embodiments are marked with dashed boxes.

Action 901. The second IMS node 16 registers the network function instance with the contact information at the network repository function node being the first core network node. The contact information for the network function instance comprises the SBI address and the SIP address. The second IMS node 16 may register the network function instance by registering the network function instance via the SBI and the registration comprising an application programming interface address for the network function instance's services exposed over the network function instance's SBI address and the network function instance's SIP address.

Action 902. The second IMS node 16 may receive from the first IMS node 15 or from a core network node, the request for the service relating to the network function instance.

Action 903. The second IMS node 16 may then transmit to the first IMS node 15 or the core network node the response relating to the service. The service may for example relate to subscribe to updated information. Updated information may comprise but are not limited to one or more of the following: a change of PLMN, change of RAT Type, and change of IP connectivity access network, CAN.

Figure 10:
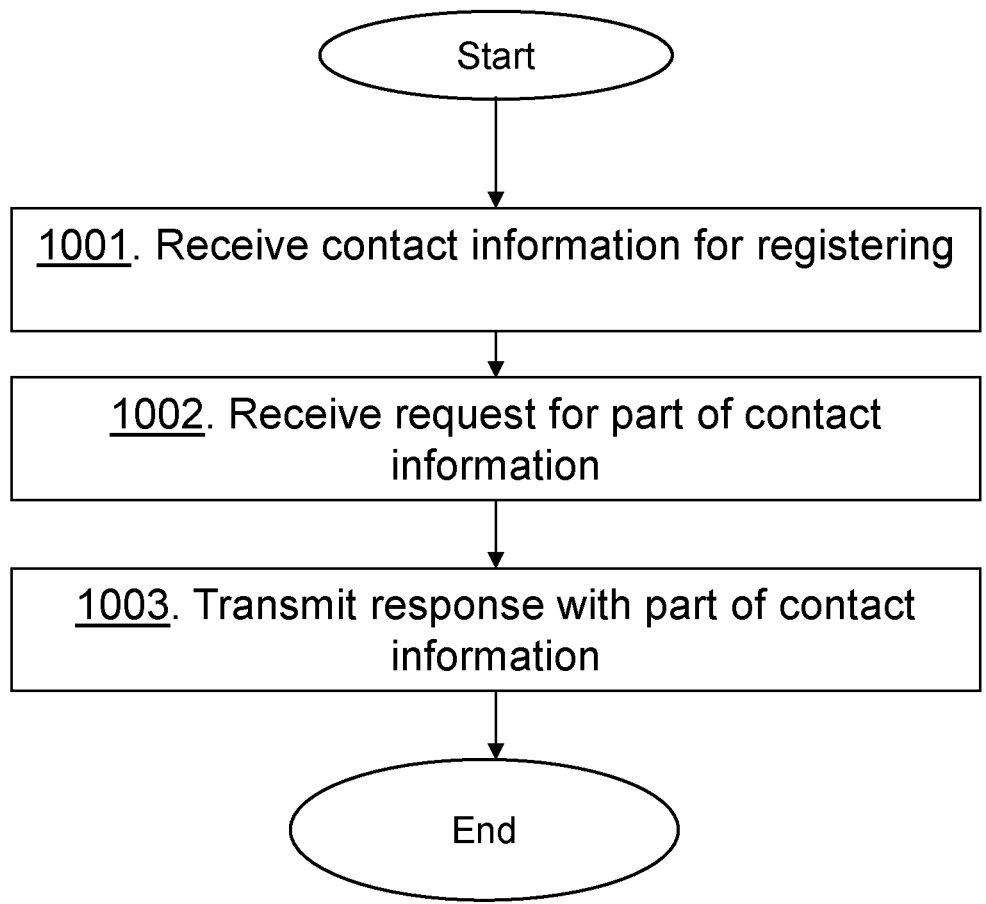
FIG. 10 is a flowchart depicting embodiments of a method performed by a core network node.

Example embodiments of a method performed by the first core network node 13 such as a NRF, for handling the network function in the communication network will now be described with reference to a flowchart depicted in FIG. 10. The actions do not have to be taken in the order stated below, but may be taken in any suitable order.

Action 1001. The first core network node 13 receives a registering of the network function instance with the contact information from the second IMS node 16. The registering of the network function instance may comprise registering the network function instance via the SBI and the registration comprising an application programming interface address for the network function instance's services exposed over the network function instance's SBI address and the network function instance's SIP address.

Action 1002. The first core network node 13 receives from the first IMS node 15 or another core network node, the request for at least the part of the contact information, such as the SBI address, of the network function instance. The request may comprise another part of the contact information such as the SIP address.

Action 1003. The first core network node 13 transmits the response to the first IMS node 15 or the other core network node with the at least the part of the contact information for the network function instance, wherein the contact information for the network function instance comprises the SBI address and the SIP address.

Figure 11:
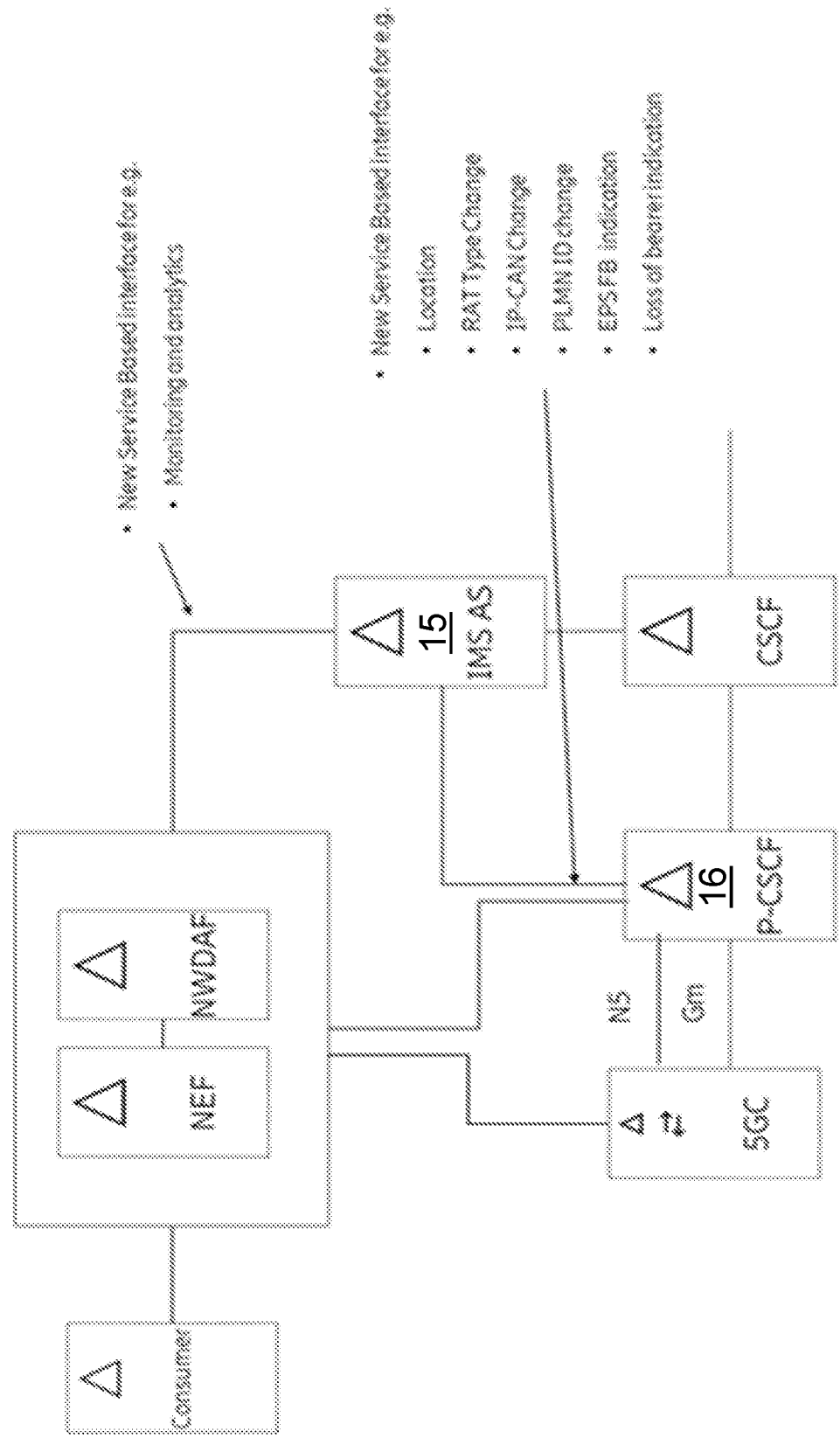
FIG. 11 is a schematic overview depicting a reference architecture for the procedure to enabling access to the IMS domain according to some embodiments herein.

Embodiments herein target new use cases, see FIG. 11, and enable faster turn around and evolution but this principle could of course be extended to other scenarios as well (several legacy IMS use cases which previously have been solved with SIP protocol or procedure extensions due to lack of other procedures). One of these is the 3:rd Party IMS Registration to IMS AS from Serving CSCF. Another example is when SCC AS (IMS AS) and ATCF (co-located with P-CSCF) need to exchange subscriber information during IMS Registration.

Additionally, Network Exposure Function (NEF) and NWDAF as described in 3GPP TS 23.501, could also use these non-session related IMS services to capture IMS level monitoring and analytics from P-CSCF and IMS AS and other IMS NFs.

SIP is and shall remain as the session protocol for call and session setups and is not subject for any change while scenarios where IMS NFs internally need to exchange information or when IMS NFs are providing information to external NFs (e.g. exposure framework) are benefiting from embodiments herein.

Figure 12:
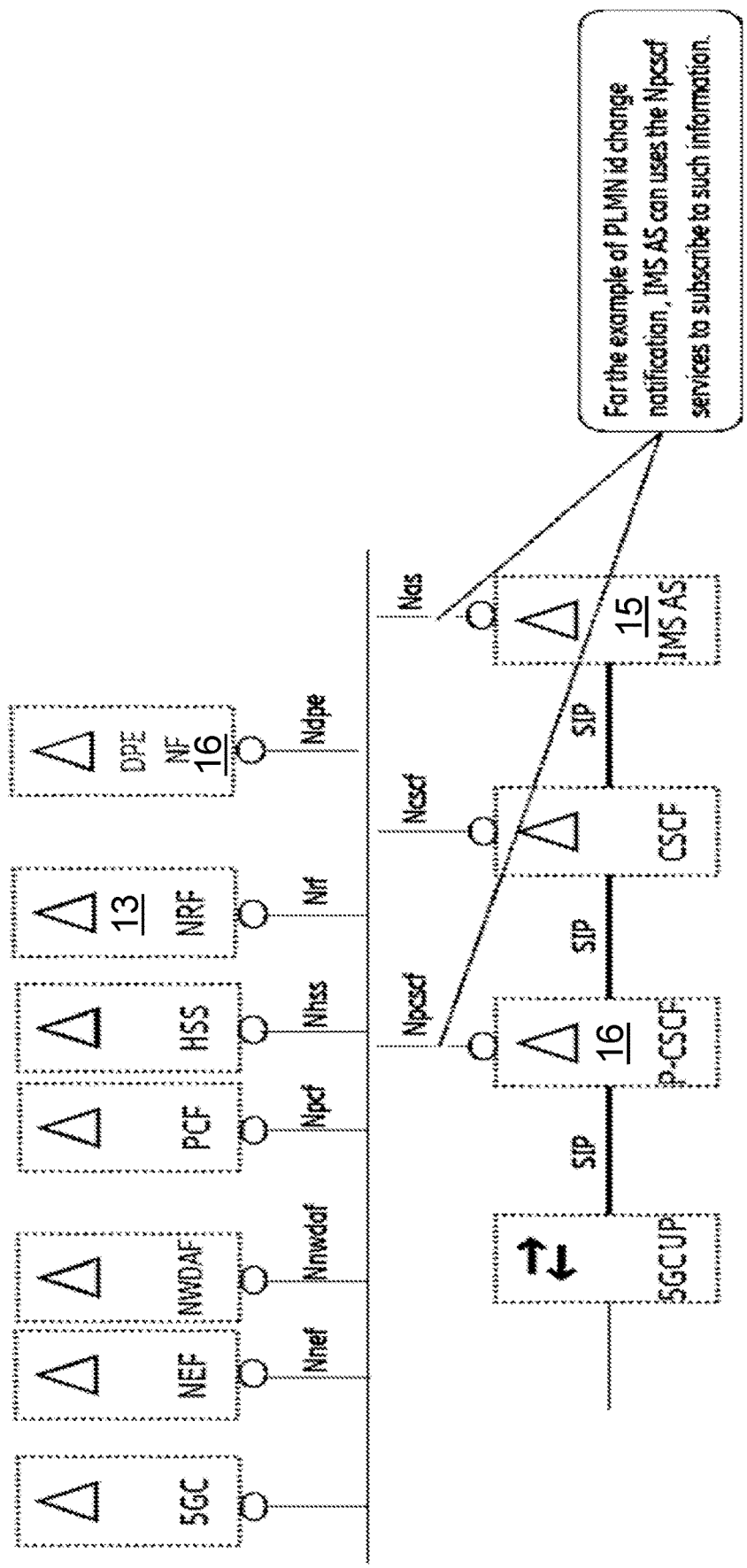
FIG. 12 is a combined signalling scheme and flowchart according to some embodiments herein.

This can additionally be extended to a new IMS NF role, for example, for the second IMS node 16, which extends IMS baseline architecture with new services such as an IMS Data, Policy and Event Function (DPE), see FIG. 12. Such new services exposed over SBI in IMS NFs can also be used to introduce new functionality offered to multiple IMS NFs and entities within or outside IMS domain. New and existing upgraded NFs can use the existing SBA procedures defined for Service Based Architecture (SBA) to, discover these services via NRF and act as consumer (first IMS node) rather than duplicate and implement them in different application contexts.

Examples are common XML Document Management Server (XDMS) for group management and service specifics covering multiple applications i.e. used by different IMS AS types and in different contexts. Service policies and subscription information common for different IMS services or other elements of data which may be used in multiple service contexts e.g. both in VoLTE/Voice in 5GS and Mission-Critical Push-to-talk (MCPTT) context.

FIG. 12 shows embodiments wherein NWDAF and NEF are prior art, but the usage within Communication services is new. For the example of PLMN ID change notification, the first IMS node 15 the IMS AS may use the Npcscf services to subscribe to such information.

Figure 13:
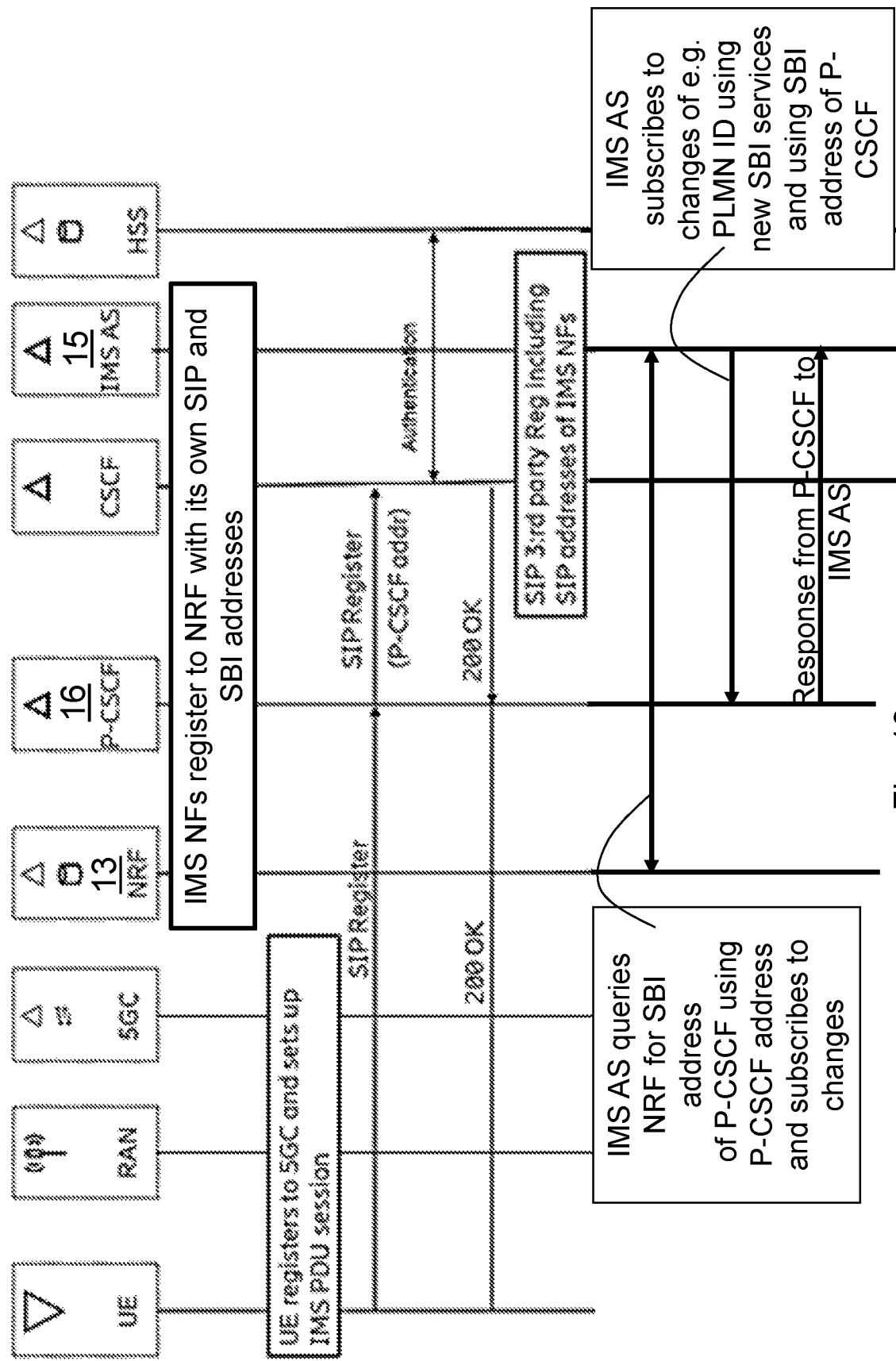
FIG. 13 is a schematic overview showing access to IMS services via SNPN using AKMA according to some embodiments herein.

Another aspect to consider is also how IMS NFs (first IMS node 15) acting as consumer will find the correct instance of IMS NF acting as Service Provider (second IMS node 16). This is as example when the IMS AS (service consumer) like to subscribe to information provided by P-CSCF (service provider), see FIG. 13.

The solution proposed for this issue is based on using NRF as defined in 3GPP TS 23.501, i.e. the first core network node 13.

All NF instances acting as producers of services exposed in SBI need to register to NRF. It is proposed that IMS NF instances providing services to other IMS NFs, shall register both their services exposed in SBI including their API root address (prior art) and also their SIP address (new). Thus, the IMS AS registers its IMS NF instance to NRF with its own SIP and SBI addresses.

The existing (legacy) behavior in IMS is that every UE performs a IMS (SIP) Registration to the IMS network at bootup. Thus, the UE registers to 5GC and sets up IMS PDU session. The SIP registration will reach P-CSCF and CSCF in IMS and will also be notified to IMS AS. In this process the IMS NF instances serving this particular UE for the duration of the registration are selected. The SIP Registration procedures includes distribution of the SIP addresses of the selected IMS NF instances. Thus, authentication with the HSS, and confirmation back to the UE will occur as well as SIP 3:rd party register including SIP addresses of IMS NFs.

According to embodiments herein IMS NF acting as a SBI service consumer, can by querying NRF using the NF Type e.g. P-CSCF, produced service and a SIP address to an instance of that NF type retrieve the SBI API root address of the service produced in that NF instance. An IMS NF acting as a SBI service consumer e.g. an IMS AS NF instance may serve subscribers served by multiple IMS NF service producer instances e.g. P-CSCFs. For example, the IMS AS queries the NRF for SBI address of P-CSCF using the P-CSCF SIP address and subscribes to changes, and the SBI address is received. Furthermore, the IMS AS contacts the P-CSCF and subscribes to changes of e.g. PLMN ID by using the SBI address of the P-CSCF and using a new SBI service. The P-CSCF may the provide response to the IMS AS.

There are also scenarios in IMS when an IMS NF instance is re-selected. This applies as example for IMS AS instance and CSCF instance (re-selection of P-CSCF instance implies a new initial IMS Registration). When a re-selection takes place, the newly selected IMS NF instance would perform the mentioned procedure to discover the service consumer instance. The old IMS serving node instance, should connect any SBI subscription to IMS Registration state, i.e. when IMS Registration is expired in the IMS NF instance, corresponding SBI subscriptions will also be removed.

Figure 14:
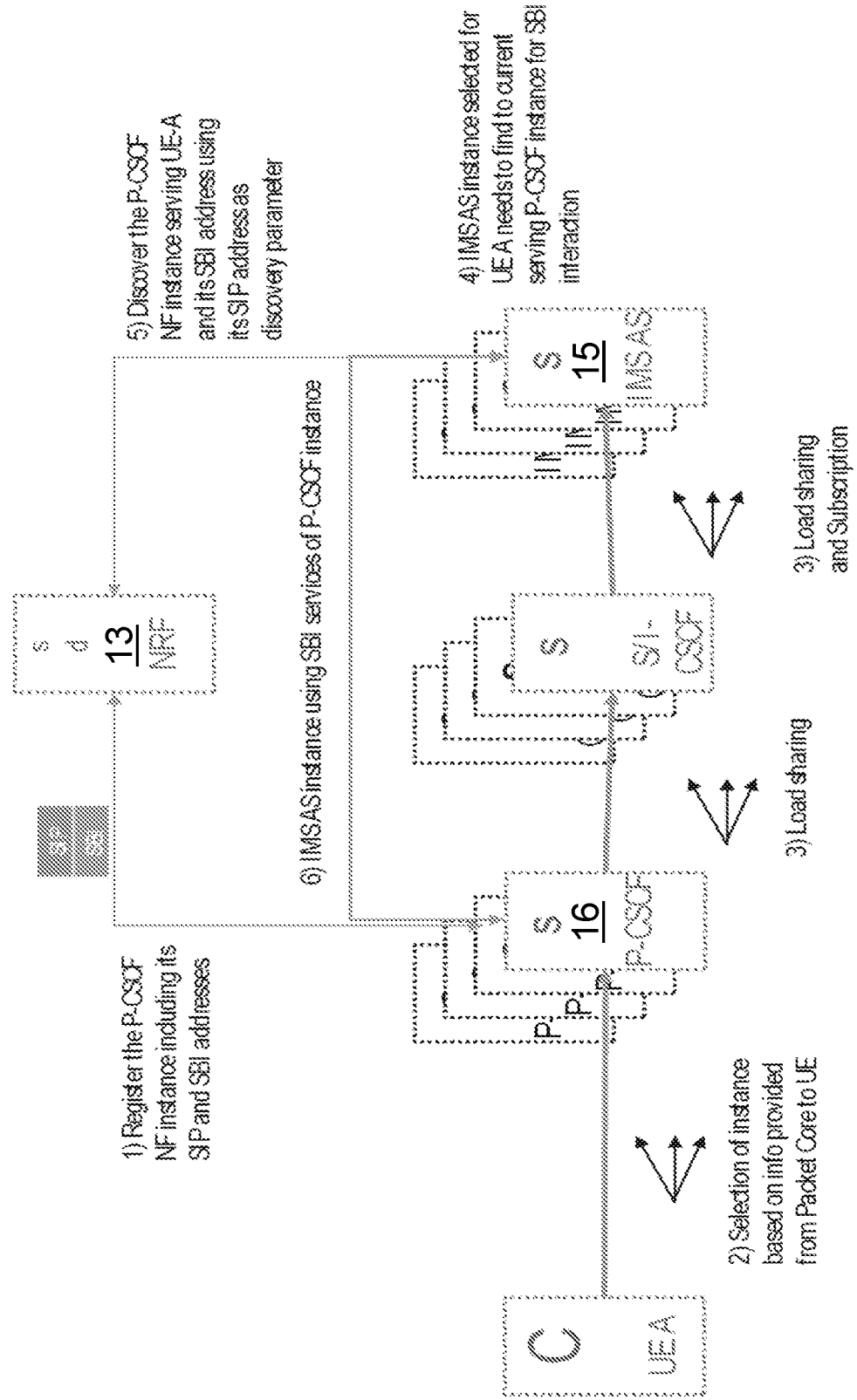
FIG. 14 is another combined signalling scheme and flowchart according to some embodiments herein.

FIG. 14 shows discovery of SBI API root address via SIP address of an IMS NF instance in NRF (Address IP address or FQDN).

Action 1. The second IMS node 16 registers the P-CSCF NF instance including its SIP and SBI address to the NRF 13.

Action 2. A selection is performed of instance based on info provided from packet core to the UE 10.

Action 3. Load sharing is performed between the different serving CSCFs and/or the IMS as (first IMS nodes).

Action 4. The IMS AS instance selected to the UE 10 needs to find the current P-CSCF instance for SBI interaction.

Action 5. The IMS AS instance performs a discovery according to embodiments herein wherein the IMS AS discovers the P-CSCF NF instance serving the UE 10 and its SBI address using its SIP address as discovery parameter.

Action 6. The IMS AS instance using SBI services of P-CSCF instance.

Figure 15:
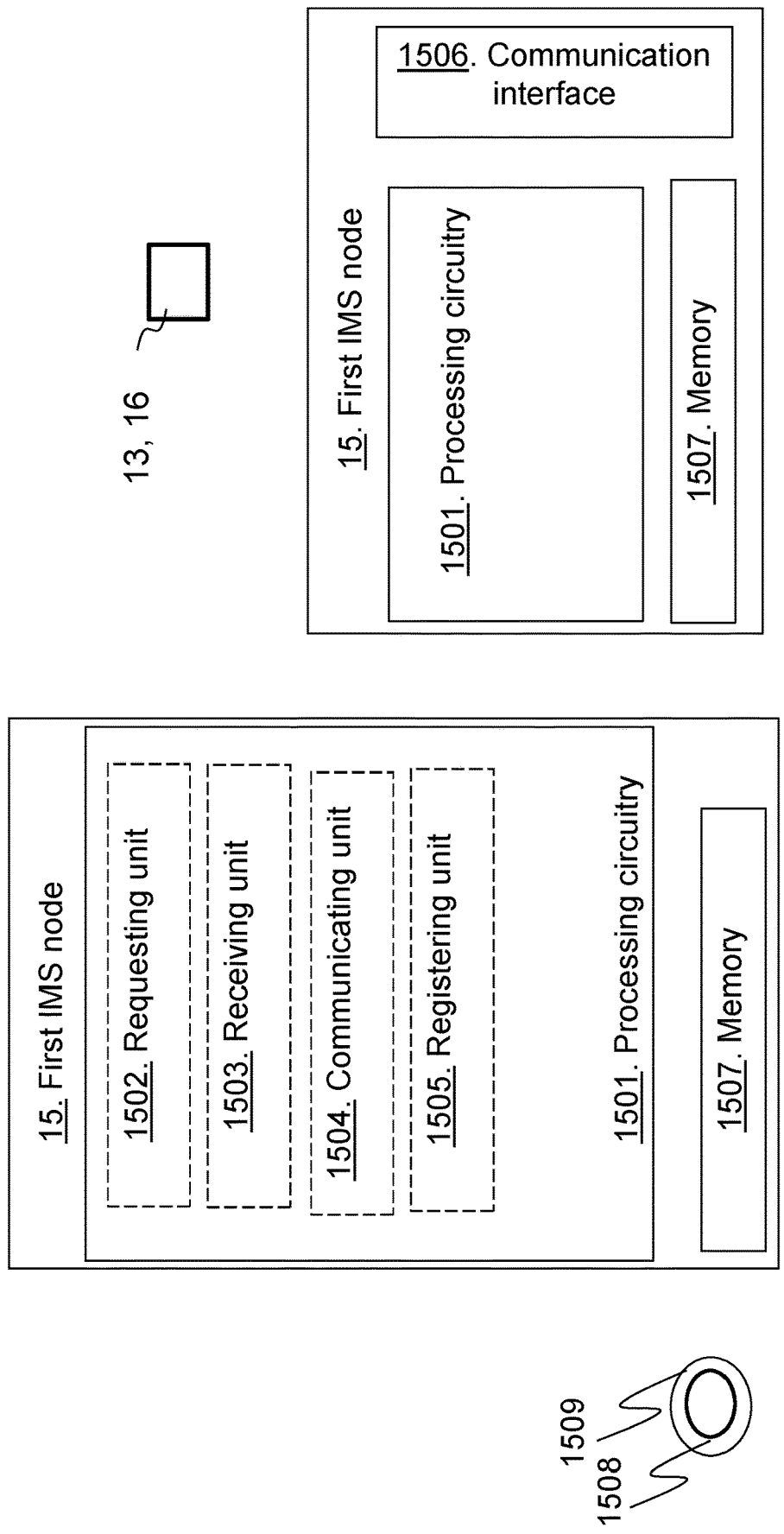
FIG. 15 is a schematic block diagram illustrating embodiments of a first IMS node.

FIG. 15 is a block diagram depicting the first IMS node 15 for handling a network function in a communication network, according to embodiments herein.

The first IMS node 15 may comprise processing circuitry 1501, e.g. one or more processors, configured to perform the methods herein.

The first IMS node 15 may comprise a requesting unit 1502. The first IMS node 15, the processing circuitry 1501, and/or the requesting unit 1502 is configured to request the first core network node such as a NRF for at least the part of the contact information of the network function instance. The request may comprise another part of the contact information such as SIP address.

The first IMS node 15 may comprise a receiving unit 1503. The first IMS node 15, the processing circuitry 1501, and/or the receiving unit 1503 is configured to receive the response from the first core network node with at least the part of the contact information for the network function instance. The contact information for the network function instance may comprise a SBI address and/or a SIP address.

The first IMS node 15 may comprise a communicating unit 1504. The first IMS node 15, the processing circuitry 1501, and/or the communicating unit 1504 is configured to communicate with the second IMS node or the core network node over the service based interface, based on the received part of the contact information, e.g. SBI address, for the network function instance. The first IMS node 15, the processing circuitry 1501, and/or the communicating unit 1504 may be configured to communicate with the second IMS node by transmitting to the second IMS node, a request for a service relating to the network function instance. The first IMS node 15, the processing circuitry 1501, and/or the communicating unit 1504 may be configured to communicate with the second IMS node by receiving a response relating to the service from the second IMS node. The service may relate to subscribe to update information comprising one or more of the following:

a change of PLMN; change of RAT Type; and change of IP CAN.

The first IMS node 15 may comprise a registering unit 1505. The first IMS node 15, the processing circuitry 1501, and/or the registering unit 1505 may be configured to register a (another) network function instance at a network repository function node being the first core network node. The first IMS node 15, the processing circuitry 1501, and/or the registering unit 1505 may be configured to register the network function instance via the SBI and the registration comprising an application programming interface address for the network function instance's services exposed over the network function instance's service based interface address and the network function instance's session initiation protocol address.

The first IMS node 15 further comprises a memory 1507. The memory 1507 comprises one or more units to be used to store data on, such as contact information, network function instance, indication information, private identifiers, public identifiers, authentication vectors, first security keys, second security keys, input/output data, metadata, etc. and applications to perform the methods disclosed herein when being executed, and similar. The first IMS node 15 may further comprise a communication interface 1506 comprising e.g. one or more antenna or antenna elements.

The methods according to the embodiments described herein for the first IMS node 15 are respectively implemented by means of e.g. a computer program product 1508 or a computer program, comprising instructions, i.e., software code portions, which, when executed on at least one processor, cause the at least one processor to carry out the actions described herein, as performed by the first IMS node 15. The computer program product 1508 may be stored on a computer-readable storage medium 1509, e.g. a disc, a universal serial bus (USB) stick or similar. The computer-readable storage medium 1509, having stored thereon the computer program product, may comprise the instructions which, when executed on at least one processor, cause the at least one processor to carry out the actions described herein, as performed by the first IMS node 15. In some embodiments, the computer-readable storage medium may be a transitory or a non-transitory computer-readable storage medium. Thus, embodiments herein may disclose a first IMS node handling the network function in a communication network, wherein the first IMS node comprises processing circuitry and a memory, said memory comprising instructions executable by said processing circuitry whereby said first IMS node is operative to perform any of the methods herein.

Figure 16:
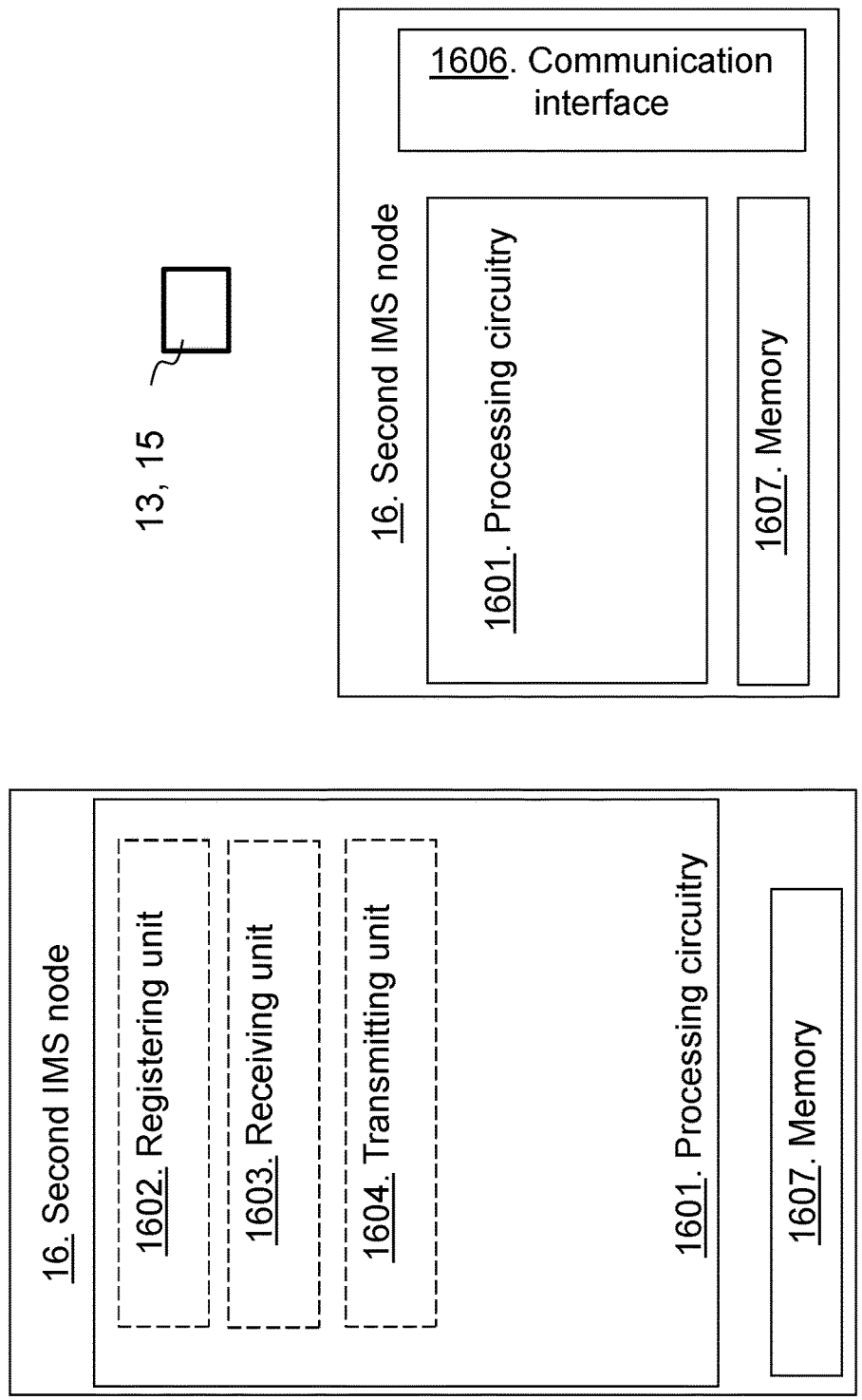
FIG. 16 is a schematic block diagram illustrating embodiments of a second IMS node.

FIG. 16 is a block diagram depicting the second IMS node 16, such as a P-CSCF or TAS, for handling the network function in the communication network, according to embodiments herein.

The second IMS node 16 may comprise processing circuitry 1601, e.g. one or more processors, configured to perform the methods herein.

The second IMS node 16 may comprise a registering unit 1602. The second IMS node 16, the processing circuitry 1601, and/or the registering unit 1602 is configured to register the network function instance with the contact information at the network repository function node being the first core network node, wherein the contact information for the network function instance comprises a SBI address and a SIP address. The second IMS node 16, the processing circuitry 1601, and/or the registering unit 1602 may be configured to register the network function instance via the SBI and the registration comprising the application programming interface address for the network function instance's services exposed over the network function instance's service based interface address and the network function instance's session initiation protocol address.

The second IMS node 16 may comprise a receiving unit 1603. The second IMS node 16, the processing circuitry 1601, and/or the receiving unit 1603 may be configured to receive from the first IMS node, the request for the service relating to the network function instance.

The second IMS node 16 may comprise a transmitting unit 1604. The second IMS node 16, the processing circuitry 1601, and/or the transmitting unit 1604 may be configured to transmit to the first IMS node, the response relating to the service.

The second IMS node 16 further comprises a memory 1607. The memory 1607 comprises one or more units to be used to store data on, such as contact information, network function instance, indication information, private identifiers, public identifiers, authentication vectors, input/output data, metadata, etc. and applications to perform the methods disclosed herein when being executed, and similar. The second IMS node 16 may further comprise a communication interface 1606 comprising e.g. one or more antenna or antenna elements.

The methods according to the embodiments described herein for the second IMS node 16 are respectively implemented by means of e.g. a computer program product 1608 or a computer program, comprising instructions, i.e., software code portions, which, when executed on at least one processor, cause the at least one processor to carry out the actions described herein, as performed by the second IMS node 16. The computer program product 1608 may be stored on a computer-readable storage medium 1609, e.g. a disc, a universal serial bus (USB) stick or similar. The computer-readable storage medium 1609, having stored thereon the computer program product, may comprise the instructions which, when executed on at least one processor, cause the at least one processor to carry out the actions described herein, as performed by the second IMS node 16. In some embodiments, the computer-readable storage medium may be a transitory or a non-transitory computer-readable storage medium. Thus, embodiments herein may disclose a second IMS node handling the network function in a communication network, wherein the second IMS node comprises processing circuitry and a memory, said memory comprising instructions executable by said processing circuitry whereby said second IMS node is operative to perform any of the methods herein.

Figure 17:
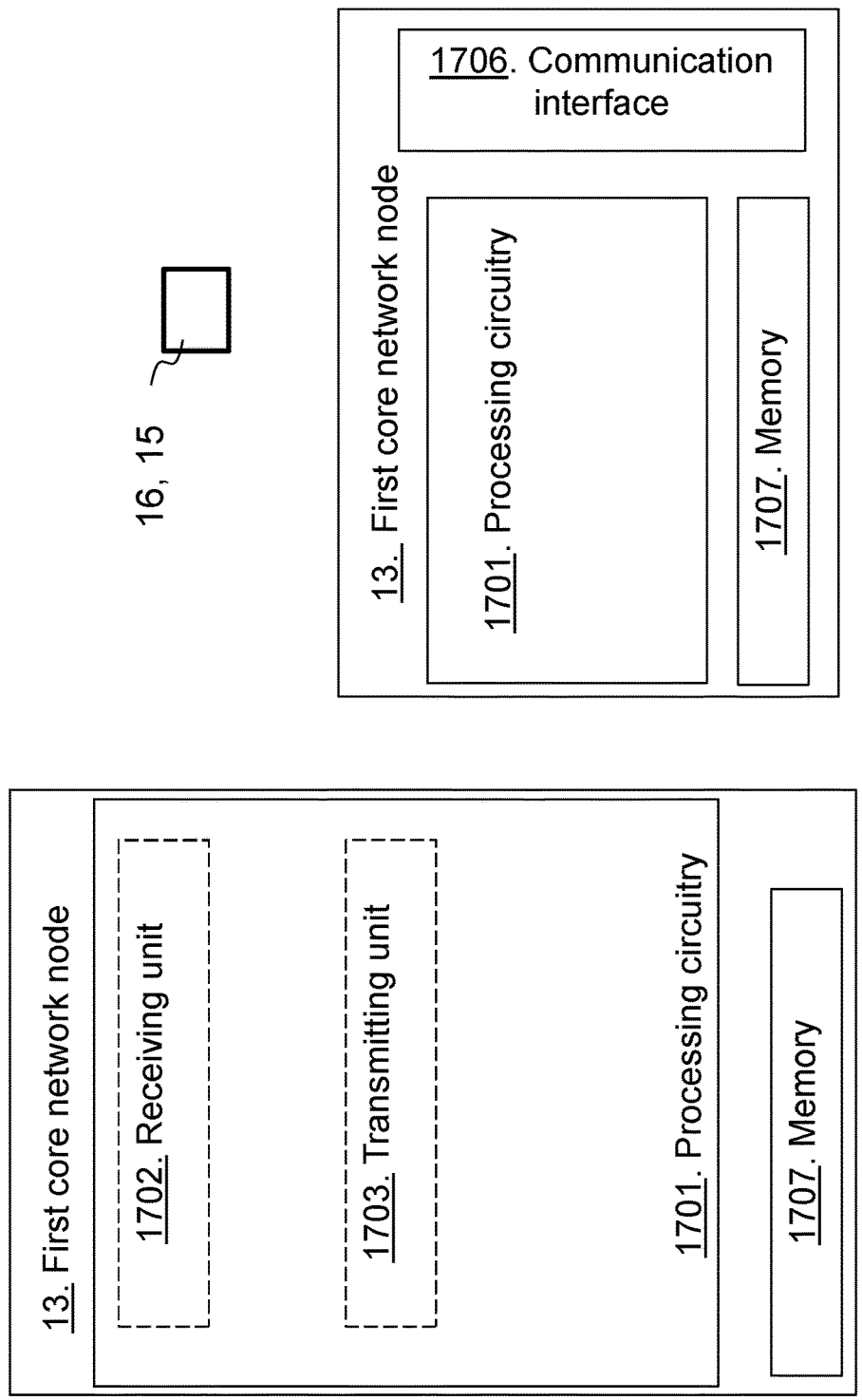
FIG. 17 is a schematic block diagram illustrating embodiments of a first core network node.

FIG. 17 is a block diagram depicting the first core network node such as the NRF, for handling the network function in the communication network according to embodiments herein.

The first core network node 13 may comprise processing circuitry 1701, e.g. one or more processors, configured to perform the methods herein.

The first core network node 13 may comprise a receiving unit 1702. The first core network node 13, the processing circuitry 1701, and/or the receiving unit 1702 is configured to receive the registering of the network function instance with contact information, e.g. SBI address and SIP address, from the second IMS node.

Furthermore, the first core network node 13, the processing circuitry 1701, and/or the receiving unit 1702 is configured to receive the request from the first IMS node or another core network node for at least part of the contact information of the network function instance. The first core network node 13, the processing circuitry 1701, and/or the receiving unit 1702 may be configured to register the network function instance via the service based interface and the registration comprising the application programming interface address for the network function instance's services exposed over the network function instance's service based interface address and the network function instance's session initiation protocol address.

The first core network node 13 may comprise a transmitting unit 1703. The first core network node 13, the processing circuitry 1701, and/or the transmitting unit 1703 is configured to transmit the response to the first IMS node or the other core network node with at least the part of contact information for the network function instance, wherein the contact information for the network function instance comprises a SBI address and a SIP address.

The first core network node 13 further comprises a memory 1707. The memory 1707 comprises one or more units to be used to store data on, such as contact information, network function instance, indication information, private identifiers, public identifiers, authentication vectors, input/output data, metadata, etc. and applications to perform the methods disclosed herein when being executed, and similar. The first core network node 13 may further comprise a communication interface 1706 comprising e.g. one or more antenna or antenna elements.

The methods according to the embodiments described herein for the first core network node 13 are respectively implemented by means of e.g. a computer program product 1708 or a computer program, comprising instructions, i.e., software code portions, which, when executed on at least one processor, cause the at least one processor to carry out the actions described herein, as performed by the first core network node 13. The computer program product 1708 may be stored on a computer-readable storage medium 1709, e.g. a disc, a universal serial bus (USB) stick or similar. The computer-readable storage medium 1709, having stored thereon the computer program product, may comprise the instructions which, when executed on at least one processor, cause the at least one processor to carry out the actions described herein, as performed by the first core network node 13. In some embodiments, the computer-readable storage medium may be a transitory or a non-transitory computer-readable storage medium. Thus, embodiments herein may disclose a first core network node 13 handling the network function in a communication network, wherein the first core network node 13 comprises processing circuitry and a memory, said memory comprising instructions executable by said processing circuitry whereby said first core network node 13 is operative to perform any of the methods herein.

In some embodiments a more general term "network node" is used and it can correspond to any type of radio-network node or any network node, which communicates with a wireless device and/or with another network node. Examples of network nodes are gNodeB, eNodeB, NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any radio access technology (RAT) or multi-RAT systems, where the devices receives and/or transmit signals, e.g. data, such as New Radio (NR), Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing units discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Further Extensions and Variations

Figure 18:
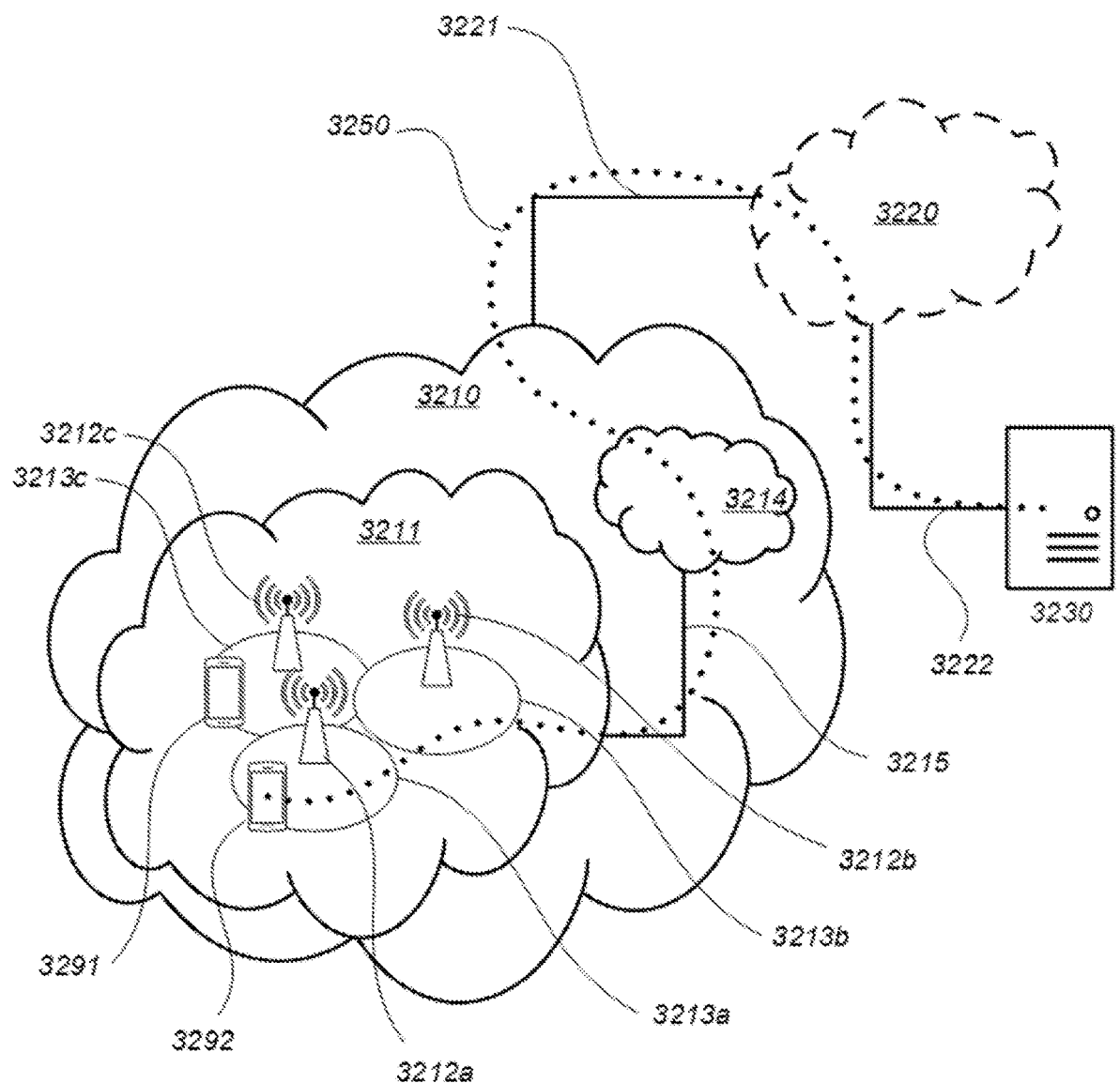
FIG. 18 schematically illustrates a telecommunication network connected via an intermediate network to a host computer.

With reference to FIG. 18, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the radio network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless devices 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 18 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 19. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 19) served by the base station 3320. The communication interface 3326 may be configured to facilitate a connection 3360 to the host computer 3310. The connection 3360 may be direct or it may pass through a core network (not shown in FIG. 19) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 19:
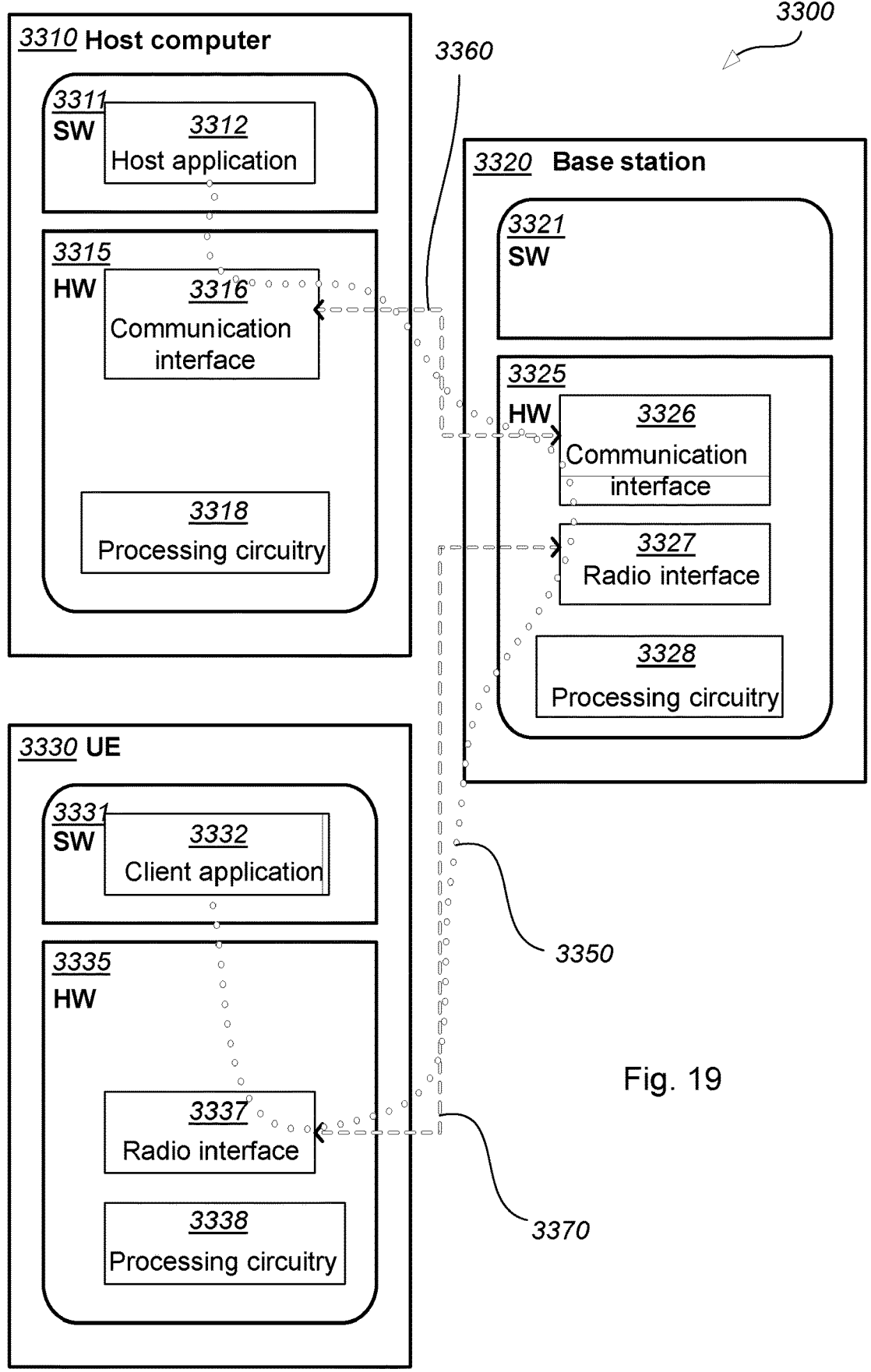
FIG. 19 is a generalized block diagram of a host computer communicating via a base station with a user equipment over a partially wireless connection.

It is noted that the host computer 3310, base station 3320 and UE 3330 illustrated in FIG. 19 may be identical to the host computer 3230, one of the base stations 3212a, 3212b, 3212c and one of the UEs 3291, 3292 of FIG. 18, respectively. This is to say, the inner workings of these entities may be as shown in FIG. 19 and independently, the surrounding network topology may be that of FIG. 18.

In FIG. 19, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve efficiency not relying on the SIP and reducing power consumption and thereby provide benefits such as user waiting time, better responsiveness, and extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 20 is a flowchart illustrating a method implemented in a communication system, in accordance with one embodiment. The communication system includes a host computer, a base station such as an AP STA, and a UE such as a Non-AP STA which may be those described with reference to FIG. 18 and FIG. 19. For simplicity of the present disclosure, only drawing references to FIG. 20 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 21 is a flowchart illustrating a method implemented in a communication system, in accordance with one embodiment. The communication system includes a host computer, a base station such as an AP STA, and a UE such as a Non-AP STA which may be those described with reference to FIG. 18 and FIG. 19. For simplicity of the present disclosure, only drawing references to FIG. 21 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 22:
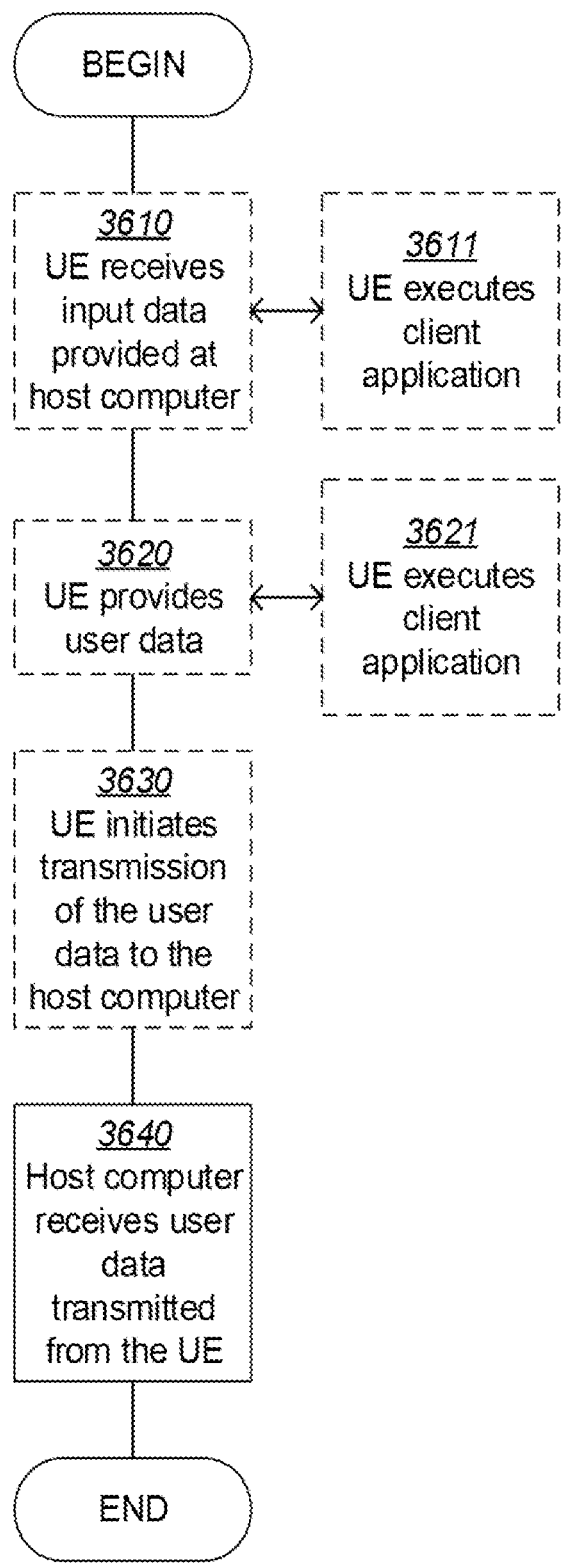

FIG. 22 is a flowchart illustrating a method implemented in a communication system, in accordance with one embodiment. The communication system includes a host computer, a base station such as an AP STA, and a UE such as a Non-AP STA which may be those described with reference to FIG. 18 and FIG. 19. For simplicity of the present disclosure, only drawing references to FIG. 22 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 23:
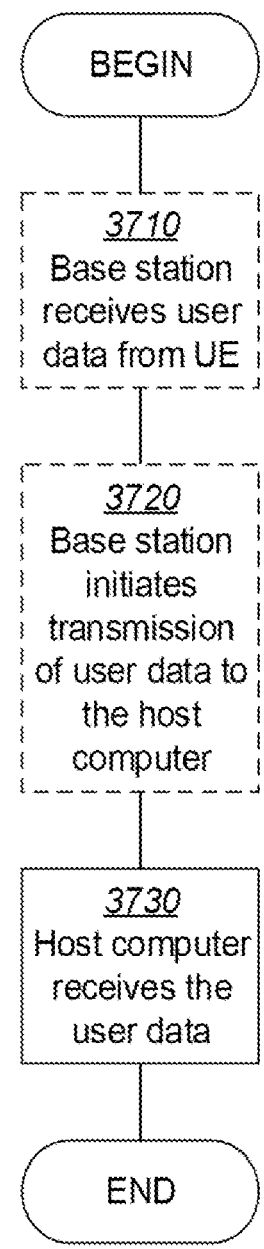

FIG. 23 is a flowchart illustrating a method implemented in a communication system, in accordance with one embodiment. The communication system includes a host computer, a base station such as an AP STA, and a UE such as a Non-AP STA which may be those described with reference to FIG. 18 and FIG. 19. For simplicity of the present disclosure, only drawing references to FIG. 23 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a first IP multimedia subsystem (IMS) node, for handling a network function in a communication network, the method comprising:
   requesting, from a first core network node, at least part of contact information for a network function instance, wherein the contact information for the network function instance comprises a service based interface (SBI) address and a session initiation protocol (SIP) address;
   receiving, from the first core network node, a response including the at least part of the contact information for the network function instance; and
   communicating with a second IMS node or a core network node over a service based interface, based on the received at least part of the contact information for the network function instance.

2. The method according to claim 1, wherein communicating over the service based interface is based on an HTTP/2 protocol.

3. The method according to claim 1, wherein communicating comprises transmitting to the second IMS node a request for a service relating to the network function instance.

4. The method according to claim 3, wherein communicating comprises receiving a response relating to the service from the second IMS node.

5. The method according to claim 3, wherein the service relates to subscribe to update information comprising one or more of the following: a change of public land mobile network (PLMN), change of radio access technology type, and change of IP connectivity access network (CAN).

6. The method according to claim 1, wherein the first core network node is a network repository function node and the method further comprises registering, at the network repository function node, a further network function instance with further contact information associated with the first IMS node.

7. The method according to claim 6, wherein registering the further network function instance is via a service based interface, wherein the registered further contact information includes:

an application programming interface address for the further network function instance's services exposed over the further network function instance's SBI address, and the further network function instance's SIP address.

8. A method performed by a second IP multimedia subsystem (IMS) node, for handling a network function in a communication network, the method comprising:

registering a network function instance with contact information at a network repository function node, wherein the network repository function node is a first core network node, wherein the contact information for the network function instance comprises a service based interface address and a session initiation protocol (SIP) address.

9. The method according to claim 8, wherein registering the network function instance comprises registering the network function instance via a service based interface and the registration comprising an application programming interface address for network function instance's services exposed over network function instance's service based interface address and network function instance's session initiation protocol address.

10. The method according to claim 8, further comprising
receiving from a first IMS node, a request for a service relating to the network function instance; and
transmitting to the first IMS node, a response relating to the service.

11. A method performed by a first core network node, for handling a network function in a communication network, the method comprising:

receiving a registering of a network function instance with contact information from a second IP multimedia subsystem (IMS) node;

receiving a request from a first IMS node or another core network node for at least part of the contact information of the network function instance; and transmitting a response to the first IMS node or the other core network node with the part of the contact information for the network function instance, wherein the contact information for the network function instance comprises a service based interface address and a session initiation protocol (SIP) address.

12. The method according to claim 11, wherein the registering of the network function instance comprises registering the network function instance via a service based interface, and wherein the registration includes:

an application programming interface address for the network function instance's services exposed over the network function instance's service based interface address, and the network function instance's session initiation protocol address.

13. A first IP multimedia subsystem (IMS) node, configured to handle a network function in a communication network, wherein the first IMS node comprises processing circuitry configured to perform the method of claim 1.

14. The first IMS node according to claim 13, wherein the processing circuitry is configured to communicate over the service based interface using an HTTP/2 protocol.

15. The first IMS node according to claim 13, wherein the processing circuitry is configured to communicate with the second IMS node by:

transmitting to the second IMS node a request for a service relating to the network function instance, receiving a response relating to the service from the second IMS node.

16. The first IMS node according to claim 15, wherein the service relates to subscribe to update information comprising one or more of the following: a change of public land mobile network (PLMN); change of radio access technology (RAT) Type; and change of IP connectivity access network (CAN).

17. The first IMS node according to claim 13, wherein the first core network node is a network repository function node, wherein the processing circuitry is further configured to register, at the network repository function node, a further network function instance with further contact information associated with the first IMS node.

18. The first IMS node according to claim 17, wherein the processing circuitry is configured to register the further network function instance via a service based interface, and wherein the registered further contact information includes:

an application programming interface address for the further network function instance's services exposed over the further network function instance's SBI address, and the further network function instance's SIP address.

19. A second IP multimedia subsystem (IMS) node configured to handle a network function in a communication network, wherein the second IMS node comprises processing circuitry configured to perform the method of claim 8.

20. A first core network node configured to handle a network function in a communication network, wherein the first core network node comprises processing circuitry configured to perform the method of claim 11.

\* \* \* \* \*